US011386357B1

(12) United States Patent
Kapoor et al.

(10) Patent No.: US 11,386,357 B1
(45) Date of Patent: Jul. 12, 2022

(54) SYSTEM AND METHOD OF TRAINING MACHINE LEARNING MODELS TO GENERATE INTUITIVE PROBABILITIES

(71) Applicant: Numerify, Inc., San Jose, CA (US)

(72) Inventors: Rahul Kapoor, Bellevue, WA (US); Govind Saria, Chandigarh (IN)

(73) Assignee: Digital.ai Software, Inc., Burlington, MA (US)

( * ) Notice: Subject to any disclaimer, the term of this patent is extended or adjusted under 35 U.S.C. 154(b) by 378 days.

(21) Appl. No.: 16/816,648

(22) Filed: Mar. 12, 2020

(51) Int. Cl.
*G06F 16/00* (2019.01)
*G06N 20/00* (2019.01)
*G06K 9/62* (2022.01)
*G06F 17/18* (2006.01)

(52) U.S. Cl.
CPC ............. *G06N 20/00* (2019.01); *G06F 17/18* (2013.01); *G06K 9/6267* (2013.01)

(58) Field of Classification Search
CPC ............. G06F 16/2425; G06F 16/2428; G06F 16/2423; G06F 17/18; G06N 20/00; G06K 9/6267
See application file for complete search history.

(56) References Cited

U.S. PATENT DOCUMENTS

| | | | | |
|---|---|---|---|---|
| 10,769,766 B1 * | 9/2020 | Padfield | ............... | G06K 9/6259 |
| 10,936,947 B1 * | 3/2021 | Flunkert | ............... | G06N 3/0445 |
| 11,057,322 B1 * | 7/2021 | Jain | ............... | H04L 51/046 |
| 11,216,742 B2 * | 1/2022 | Bhattacharyya | ....... | G06N 7/005 |
| 2008/0133434 A1 * | 6/2008 | Asar | ....................... | G06N 20/10 |
| | | | | 706/12 |
| 2018/0018586 A1 * | 1/2018 | Kobayashi | ............... | G06N 5/04 |
| 2019/0354857 A1 * | 11/2019 | Sallee | ....................... | G06N 3/08 |
| 2020/0250139 A1 * | 8/2020 | Muffat | ................. | G06K 9/6264 |
| 2021/0089953 A1 * | 3/2021 | Bocharov | .............. | G06N 20/00 |
| 2021/0090694 A1 * | 3/2021 | Colley | .................... | G16B 40/00 |
| 2021/0319338 A1 * | 10/2021 | Lui | ........................... | G06N 5/04 |
| 2021/0326751 A1 * | 10/2021 | Liu | ........................ | G06F 40/20 |
| 2021/0374581 A1 * | 12/2021 | Wei | ........................ | G06N 5/045 |
| 2022/0051751 A1 * | 2/2022 | Wilton | .................... | G06N 7/005 |
| 2022/0094649 A1 * | 3/2022 | Le | ........................... | G06N 3/0454 |
| 2022/0129638 A1 * | 4/2022 | Yang | .................... | G06N 3/0454 |
| 2022/0136037 A1 * | 5/2022 | Vaestermark | ........ | C12Q 1/6876 |
| | | | | 435/6.11 |

* cited by examiner

*Primary Examiner* — Noosha Arjomandi
(74) *Attorney, Agent, or Firm* — Rahman LLC

(57) ABSTRACT

Systems and methods for training a machine learning (ML) model for predicting probabilities for binary outcomes to automatically generate positive class predictions close to an ideal one probability and negative class predictions close to an ideal zero probability are disclosed. The method includes generating a predictive probability (PP) curve based on a ML algorithm and transforming the PP curve into a curve with probabilities spread close to ideal one probability for positive class predictions (PCP) indicating successful prediction and close to ideal zero probability for negative class predictions (NCP) indicating failed prediction, thereby introducing a valley in the transformed probability curve separating PCP from NCP. The PP curve is transformed by one of (1) minimizing distance between: (a) ideal one probability and PP value of PCP; and (b) ideal zero probability and PP value of NCP, and (2) maximizing distance of PP values from center of PP curve.

15 Claims, 13 Drawing Sheets

SYSTEM AND METHOD OF TRAINING MACHINE LEARNING MODELS TO GENERATE INTUITIVE PROBABILITIES

BACKGROUND

Technical Field

The embodiments herein generally relate to training machine learning models, and more specifically to a system and method for training a machine learning model to automatically generate at least one positive class prediction close to an ideal one probability and at least one negative class prediction close to an ideal zero probability.

Description of the Related Art

Machine learning techniques are typically used to build a model or rule set to predict a result based on the values of one or more features. Machine learning techniques typically involve use of a training data set that includes, for each record, a value for each of a set of features, and a result. A model or rule set for predicting the result is developed based on the training data set. Machine learning techniques generally build on statistical underpinnings. Statistical approaches test a proposed model against a set of data. Machine learning techniques search through a space of possible models, to find the best model to fit a given set of data used for various commonly seen use cases such as personalization of user experiences, recommendation of products, medical diagnosis, and the like.

In several exemplary scenarios, standard machine learning algorithms are applied to generate predictions. However, standard machine algorithms may not always generate prediction probabilities matching an intuition of an average user. For instance, if a prediction is about success/failure of a change planned by an IT department within a company, an average end user would expect predicted probabilities to be close to one (1) for changes that are successful and close to zero (0) for changes that lead to failures. However, even though models generated based on standard machine learning algorithms may be able to differentiate well between success and failure cases if properly trained, they may not generate an intuitive probability distribution as desired. For instance, for change success the models may generate predictions with the bulk of the probabilities in the range of about 0.7-1.0, with failure cases towards the lower end of a predicted probability range and success cases towards the higher end of the predicted probability range. In several scenarios, it may not be possible to tune the models further to change the predicted probabilities to match the intuitive expectation of the average user of being close to 0 or 1.

Additionally, in order to present the probability results in a way that they are easy to grasp for an average end user, each prediction may be categorized (typically manually) into different predicted probability buckets such as, success very likely, success likely, failure likely, and failure very likely so that the end users do not have to deal with non-intuitive probabilities but rather just easy to understand bucket labels. However, generating the bucket labels may be an extremely labor-intensive process. Alternatively, algorithms may be developed that understand the domain and know how the data is skewed. Such custom algorithms could be designed to produce intuitive predicted probabilities, as the domain knowledge and information as to how the data is skewed would be used to generate the algorithms. However, developing such techniques may require a different algorithm for each use-case and domain. As this approach would require an organization to make a lot of investments it may not be worthwhile for the organization to invest in such an expensive and difficult research project.

Therefore, to overcome the existing problems and challenges, there remains a need for a system and method for training standard machine learning algorithms to generate models that make positive class predictions close to an ideal one probability and negative class predictions close to an ideal zero probability.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

A number of systems, processor-implemented methods, and non-transitory computer-readable mediums for training a machine learning model to predict probabilities for binary outcomes to automatically generate at least one positive class prediction close to an ideal one probability and at least one negative class prediction close to an ideal zero probability is disclosed.

In one aspect, one or more non-transitory computer readable storage mediums storing one or more sequences of instructions, which when executed by one or more processors, causes a machine learning model for predicting probabilities for binary outcomes to automatically generate at least one positive class prediction close to an ideal one probability and at least one negative class prediction close to an ideal zero probability is disclosed. In an embodiment, the method of training the machine learning model includes the steps of (a) generating a predictive probability curve based on a machine learning algorithm using a training dataset, and (b) transforming the predictive probability curve into a transformed probability curve with probabilities spread close to the ideal one probability for a plurality of positive class predictions close to the ideal zero probability for a plurality of negative class predictions, thereby introducing a valley in the transformed probability curve separating the plurality of positive class predictions from the plurality of negative class predictions, where a positive class prediction indicates a successful prediction case and a negative class prediction indicates a failed prediction case, and where the transforming comprises one of: (1) minimizing a distance between: (a) the ideal one probability and a predicted probability value of the plurality of positive class predictions, and (b) the ideal zero probability and a predicted probability value of the plurality of negative class predictions, and (2) maximizing a distance of a plurality of predicted probability values from a center of the predictive probability curve. The trained machine learning model facilitates in real-time at least one of: (1) enabling at least one automated workflow, based on one or more rules conditioned on a distribution of the predicted probabilities obtained from the trained machine learning model, and (2) correctly classifying the plurality of predicted probabilities obtained from the trained machine learning model and presenting the plurality of correctly classified predicted probabilities on a display device.

In an embodiment, the minimizing the distance includes: (1) defining an error metric for training the machine learning model, where the error comprises one of: a distance from the ideal zero probability of the plurality of negative class predictions and a distance from the ideal one probability of the plurality of positive class predictions, and (2) minimizing the error metric for shifting one or more probability values in the machine learning model closer to one of: the ideal zero probability and the ideal one probability. In an embodiment, maximizing the distance of the predicted probability values from the center of the predictive probability curve includes: (1) establishing a center of the predictive probability curve based on an ideal separation point for the plurality of positive class predictions and the plurality of negative class predictions using one or more statistical techniques as an original center, and (2) performing one of: (a) computing a normalized distance for each of the plurality of positive class predictions and the plurality of negative class predictions from the original center, and (b) shifting the original center of the predictive probability curve to 0.5 as a shifted center and computing a distance for each of the plurality of positive class predictions and the plurality of negative class predictions from 0.5 as a shifted center distance, and (3) maximizing a score created based on an average of one of: the normalized distances and the shifted center distances, where the score weighs one of: a) distance of the positive class predictions higher than distance of the negative class predictions, when correctly classifying positive class predictions is more significant than correctly classifying negative class predictions, and (b) distance of the negative class predictions higher than distance of the positive class predictions when correctly classifying negative class predictions is more significant than correctly classifying positive class predictions, thereby maximizing the distance of the plurality of predicted probability values from the original center or the shifted center of the predictive probability curve.

In an embodiment, the normalized distance is defined as: (a) for the plurality of positive class predictions: normalized distance=$(P_i-P_{original\_center})/(1-P_{original\_center})$, upon $P_i >= P_{original\_center}$, and normalized distance= $-(P_{original\_center}-P_i)/P_{original\_center}$, upon $P_i < P_{original\_center}$, and (b) for the plurality of negative class predictions: normalized distance=$(P_{original\_center}-P_i)/P_{original\_center}$, upon $P_i < P_{original\_center}$, and normalized distance= $(P_{original\_center}-P_i)/(1-P_{original\_center})$, upon $P_i >= P_{original\_center}$, where $P_i$ is the $i^{th}$ prediction of the plurality of predictions, i is a whole number, and $P_{original\_center}$ is the original center.

In an embodiment, the shifted center distance is defined as (a) for the plurality of positive class predictions, shifted center distance=$P_{i-adjusted}-0.5$, (b) for the plurality of negative class predictions, shifted center distance=$0.5-P_i$-adjusted, where for probabilities>=$P_{original\_center}$, $P_{i-adjusted}=0.5+½ *((P_i-P_{original\_center})/(1-P_{original\_center}))$ and for probabilities<$P_{original\_center}$, $P_{i-adjusted}=½ * (P_i/P_{original\_center})$, where $P_i$ is the $i^{th}$ prediction of the plurality of predictions, i is a whole number and $P_{original\_center}$ is the original center.

In another aspect, a system for training a machine learning model for predicting probabilities for binary outcomes to automatically generate at least one positive class prediction close to an ideal one probability and at least one negative class prediction close to an ideal zero probability is disclosed. The system includes: (a) a memory that stores information associated with a machine learning algorithm, (b) a processor that executes the set of instructions, where the processor is configured for training the machine learning model for predicting probabilities for binary outcomes to automatically generate the positive class prediction close to one and the negative class prediction close to zero.

The training includes: (i) generating a predictive probability curve based on the machine learning algorithm using a training dataset, and (ii) transforming the predictive probability curve into a transformed probability curve with probabilities spread close to the ideal one probability for a plurality of positive class predictions and close to the ideal zero probability for a plurality of negative class predictions, thereby introducing a valley in the transformed probability curve separating the plurality of positive class predictions from the plurality of negative class predictions, where a positive class prediction indicates a successful prediction case and a negative class prediction indicates a failed prediction case, and where the transforming includes one of: (1) minimizing a distance between: (a) the ideal one probability and a predicted probability value of the plurality of positive class predictions, and (b) the ideal zero probability and a predicted probability value of the plurality of negative class predictions, and (2) maximizing a distance of a plurality of predicted probability values from a center of the predictive probability curve. The trained machine learning model facilitates in real-time at least one of: (1) enabling at least one automated workflow, based on one or more rules conditioned on a distribution of the predicted probabilities obtained from the trained machine learning model, and (2) correctly classifying the plurality of predicted probabilities obtained from the trained machine learning model and presenting the plurality of correctly classified predicted probabilities on a display device.

In an embodiment, the processor is further configured to minimize the distance by (a) defining an error metric for training the machine learning algorithm, where the error includes one of: a distance from the ideal zero probability of the plurality of negative class predictions and a distance from the ideal one probability of the plurality of positive class predictions, and (b) minimizing the error metric for shifting one or more probability values in the machine learning model closer to one of: the ideal zero probability and the ideal one probability.

In an embodiment, the processor is further configured to maximize the distance by: (1) establishing a center of the predictive probability curve based on an ideal separation point for the plurality of positive class predictions and the plurality of negative class predictions using one or more statistical techniques as an original_center, and (2) performing one of: (a) computing a normalized distance for each of the plurality of positive class predictions and the plurality of negative class predictions from the original_center, and (b) shifting the original_center of the predictive probability curve to 0.5 as a shifted center and computing a distance for each of the plurality of positive class predictions and the plurality of negative class predictions from 0.5 as a shifted center distance, and maximizing a score created based on an average of one of: the normalized distances and the shifted center distances, where the score weighs one of: (a) distance of the positive class predictions higher than distance of the negative class predictions, upon determining that correctly classifying positive class predictions is more significant than correctly classifying negative class predictions, and (b) distance of the negative class predictions higher than distance of the positive class predictions, upon determining that correctly classifying negative class predictions is more significant than correctly classifying positive class predictions, thereby maximizing the distance of the plurality of predicted probability values from the original_center or the shifted center of the predictive probability curve.

In an embodiment, the normalized distance is defined as: for the plurality of positive class predictions: normalized distance=$(P_i-P_{original\_center})/(1-P_{original\_center})$, upon $P_i>=P_{original\_center}$, and normalized distance= $-(P_{original\_center}-P_i)/P_{original\_center}$, upon $P_i<P_{original\_center}$, and (a) for the plurality of negative class predictions: normalized distance=$(P_{original\_center}-P_i)/P_{original\_center}$, upon $P_i<P_{original\_center}$, and normalized distance=$-(P_i-P_{original\_center})/(1-P_{original\_center})$, upon $P_i>=P_{original\_center}$, where $P_i$ is $i^{th}$ prediction of the plurality of predictions, i is a whole number, and $P_{original\_center}$ is the original center.

In an embodiment, the shifted center distance is defined as: (a) for the plurality of positive class predictions shifted center distance=$P_{i-adjusted}-0.5$, (b) for the plurality of negative class predictions: shifted center distance=$0.5-P_i$-adjusted, where for probabilities>=$P_{original\_center}$, $P_{adjusted}=0.5+\frac{1}{2} *((P_i-P_{original\_center})/(1-P_{original\_center}))$, and for probabilities<$P_{original\_center}$ $P_{adjusted}=\frac{1}{2} * (P_i/P_{original\_center})$, where $P_i$ is $i^{th}$ prediction of the plurality of predictions, i is a whole number and $P_{original\_center}$ is the original center.

In yet another aspect, a processor-implemented method for training a machine learning model for predicting probabilities for binary outcomes to automatically generate at least one positive class prediction close to an ideal one probability and at least one negative class prediction close to an ideal zero probability is disclosed. In an embodiment, the processor-implemented method includes the steps of (a) generating a predictive probability curve based on a machine learning algorithm using a training dataset, and (b) transforming the predictive probability curve into a transformed probability curve with probabilities spread close to the ideal one probability for a plurality of positive class predictions and close to the ideal zero probability for a plurality of negative class predictions, thereby introducing a valley in the transformed probability curve separating the plurality of positive class predictions from the plurality of negative class predictions, where a positive class prediction indicates a successful prediction case and a negative class prediction indicates a failed prediction case, and where the transforming includes one of: (1) minimizing a distance between: (a) the ideal one probability and a predicted probability value of the plurality of positive class predictions, and (b) the ideal zero probability and a predicted probability value of the plurality of negative class predictions, and (2) maximizing a distance of a plurality of predicted probability values from a center of the predictive probability curve. The trained machine learning model facilitates in real-time at least one of: (1) enabling at least one automated workflow, based on one or more rules conditioned on a distribution of the predicted probabilities obtained from the trained machine learning model, and (2) correctly classifying the plurality of predicted probabilities obtained from the trained machine learning model and presenting the plurality of correctly classified predicted probabilities on a display device.

In an embodiment, the minimizing the distance includes: (1) defining an error metric for training the machine learning model, where the error includes one of: a distance from the ideal zero probability of the plurality of negative class predictions and a distance from the ideal one probability of the plurality of positive class predictions, and (2) minimizing the error metric for shifting one or more probability values in the machine learning model closer to one of: the ideal zero probability and the ideal one probability.

In an embodiment, the maximizing includes: (1) establishing a center of the predictive probability curve based on an ideal separation point for the plurality of positive class predictions and the plurality of negative class predictions using one or more statistical techniques as an original center, and (2) performing one of: (a) computing a normalized distance for each of the plurality of positive class predictions and the plurality of negative class predictions from the original center, and (b) shifting the original center of the predictive probability curve to 0.5 as a shifted center and computing a distance for each of the plurality of positive class predictions and the plurality of negative class predictions from 0.5 as a shifted center distance, and (3) maximizing a score created based on an average of one of: the normalized distances and the shifted center distances, where the score weighs one of: a) distance of the positive class predictions higher than distance of the negative class predictions, upon determining that correctly classifying positive class predictions is more significant than correctly classifying negative class predictions, and (b) distance of the negative class predictions higher than distance of the positive class predictions upon determining that correctly classifying negative class predictions is more significant than correctly classifying positive class predictions, thereby maximizing the distance of the plurality of predicted probability values from the original center or the shifted center of the predictive probability curve.

In an embodiment, the normalized distance is defined as: (a) for the plurality of positive class predictions: normalized distance=$(P_i-P_{original\_center})/(1-P_{original\_center})$, upon $P_i>=P_{original\_center}$, and normalized distance= $-(P_{original\_center}-P_i)/P_{original\_center}$, upon $P_i<P_{original\_center}$, and (b) for the plurality of negative class predictions: normalized distance=$(P_{original\_center}-P_i)/P_{original\_center}$, upon $P_i<P_{original\_center}$, and normalized distance= $(P_i-P_{original\_center})/(1-P_{original\_center})$; upon $P_i>=P_{original\_center}$ where $P_i$ is the $i^{th}$ prediction of the plurality of predictions, i is a whole number, and $P_{original\_center}$ is the original center.

In an embodiment, the shifted center distance is defined as (a) for the plurality of positive class predictions, shifted center distance=$P_{i-adjusted}-0.5$, (b) for the plurality of negative class predictions, shifted center distance=$0.5-P_i$-adjusted, where for probabilities>=$P_{original\_center}$ $P_{i-adjusted}=0.5+\frac{1}{2} *((P_i-P_{original\_center})/(1-P_{original\_center}))$ and for probabilities<$P_{original\_center}$ $P_{i-adjusted}=\frac{1}{2} * (P_i/P_{original\_center})$ and where $P_i$ is the $i^{th}$ prediction of the plurality of predictions, i is a whole number and $P_{original\_center}$ is the original center.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
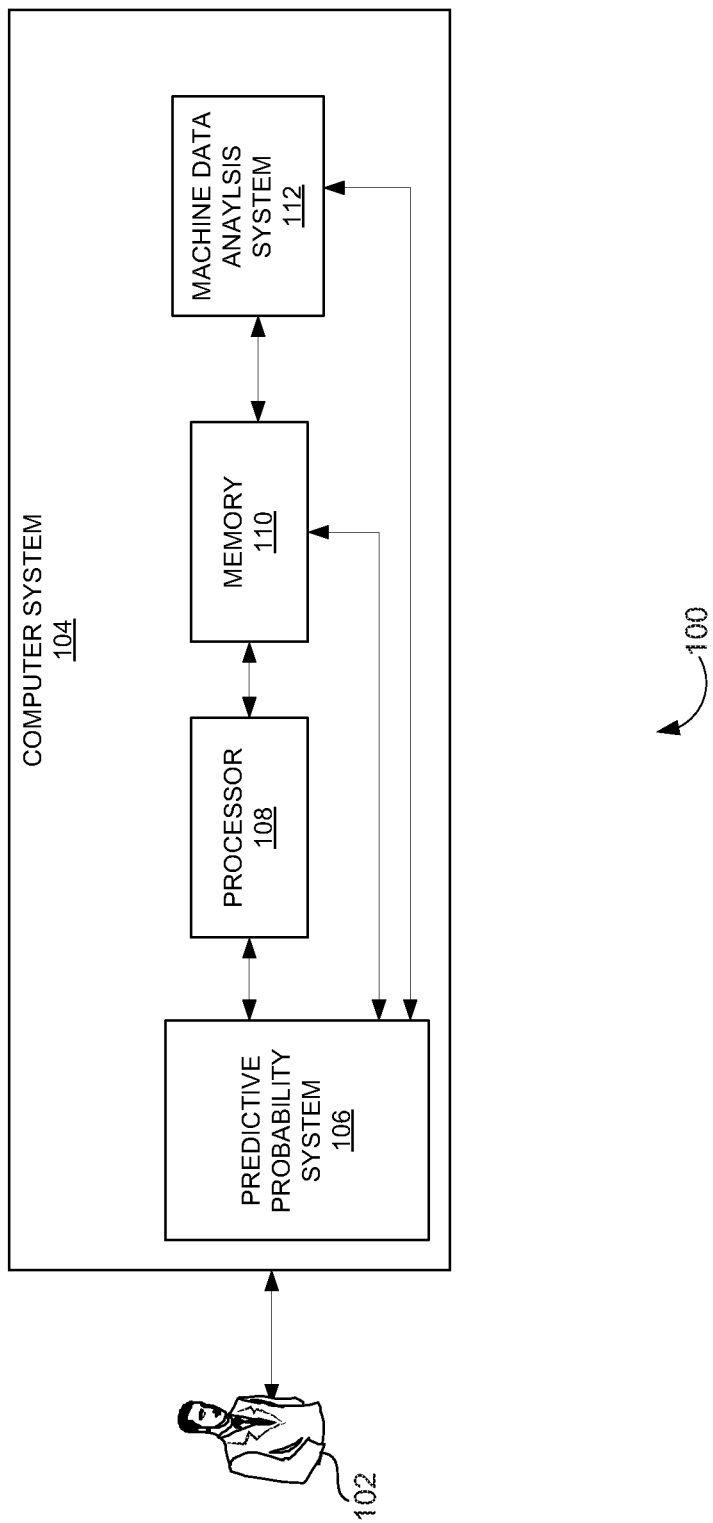
FIG. 1 is a system view illustrating a user interacting with a predictive probability system using a computer system for viewing a plurality of correctly classified predicted probabilities generated by using a machine learning model trained to automatically generate at least one positive class prediction close to an ideal one probability and at least one negative class prediction close to an ideal zero probability, according to an embodiment.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide a processor-implemented method and system for training a machine learning model to automatically generate at least one positive class prediction close to an ideal one probability and at least one negative class prediction close to an ideal zero probability. Referring now to the drawings, and more particularly to FIGS. 1 through 9, where similar reference characters denote corresponding features consistently throughout the figures, preferred embodiments are shown.

FIG. 1 is a system view illustrating a user 102 interacting with a predictive probability system 106 using a computer system 104 for training a machine learning model for predicting probabilities for binary outcomes to automatically generate at least one positive class prediction close to an ideal one probability and at least one negative class prediction close to an ideal zero probability, according to an embodiment herein. Various systems and processor-implemented methods disclosed herein enable transforming a predictive probability curve with a success/failure split but with probabilities not matching the intuition of an average user 102 into a curve with a clear success/failure probability separation with probabilities matching the intuition of the user 102 that is close to an ideal 0 probability for failure cases and close to an ideal 1 for success cases. The computer system 104 further includes a memory 110 that stores a database and a set of instructions, and a processor 108 that is configured by the set of instructions to execute the predictive probability system 106. The database stores information associated with a machine data analysis system 112. The machine data analysis system 112 generates a predictive probability curve based on a machine learning algorithm using a training data set. As used herein the term "training data set" refers to a data set used to train a machine learning model using algorithms such as logistic/linear regression, decision trees, neural networks etc. to produce expected predictions. The training data set includes both an input data and an expected output data.

The predictive probability system 106 transforms the predictive probability curve into a transformed probability curve with probabilities spread close to the ideal one probability (for example in the range 0.75-1) for a plurality of positive class predictions and close to the ideal zero probability (for example in the 0-0.25 range) for a plurality of negative class predictions, thereby introducing a valley (for example in the center between 0.25-0.75) in the transformed probability curve separating the plurality of positive class predictions from the plurality of negative class predictions. The positive class prediction indicates a successful prediction case and the negative class prediction indicates a failed prediction case. In order to enable generating probabilities that are close to the intuition of the user 102, the transformed probability curve should include a plurality of prediction values closer to the ideal 0 probability and ideal 1 probability boundaries of the transformed probability curve, with most of the predicted probability values ranging between 0-0.25 and 0.75-1 and very few predicted probability values in the center between 0.25-0.75, thus leading to the desired valley shape for the transformed predicted probability curve where it is easy to distinguish the positive class predictions from the negative class predictions due to the valley separating the two classes.

In an embodiment, the predictive probability system 106 transforms the curve by minimizing a distance between a) the ideal 1 probability and a predicted probability value from among the plurality of positive class predictions and b) the ideal zero probability and a predicted probability value from among the plurality of negative class predictions. In an embodiment, minimizing the distance includes defining an error metric for training the machine learning model. In an embodiment, the error metric includes a) a distance from the ideal zero probability of the plurality of negative class predictions, or b) a distance from the ideal one probability of the plurality of positive class predictions. The predictive probability system 106 minimizes the error metric for shifting one or more probability values in the machine learning model closer to one of: the ideal zero probability and the ideal one probability.

In another embodiment, the predictive probability system 106 transforms the curve by maximizing a distance of a plurality of predicted probability values from a center of the predictive probability curve. The predictive probability system 106 maximizes the distance by establishing a center of the predictive probability curve based on an ideal separation point for the plurality of positive class predictions and the plurality of negative class predictions using one or more statistical techniques as an original center. In an embodiment, for maximizing the distance, the predictive probability system 106 computes a normalized distance for each of the plurality of positive class predictions and the plurality of negative class predictions from the original center. In another embodiment, for maximizing the distance, the predictive probability system 106 shifts the center of the predictive probability curve to 0.5 as a shifted center and computes a distance for each of the plurality of positive class predictions and the plurality of negative class predictions from 0.5 as a shifted center distance. The predictive probability system 106 maximizes a score created based on an average of the normalized distances or the shifted center distances. The score weighs one of: a) a distance of the positive class predictions higher than distance of the negative class predictions, upon determining that correctly classifying positive class predictions is more significant than correctly classifying negative class predictions, and b) a distance of the negative class predictions higher than distance of the positive class predictions upon determining that correctly classifying negative class predictions is more significant than correctly classifying positive class predictions, thereby maximizing the distance of the plurality of predicted probability values from the original center or the shifted center of the predictive probability curve.

Figure 2:
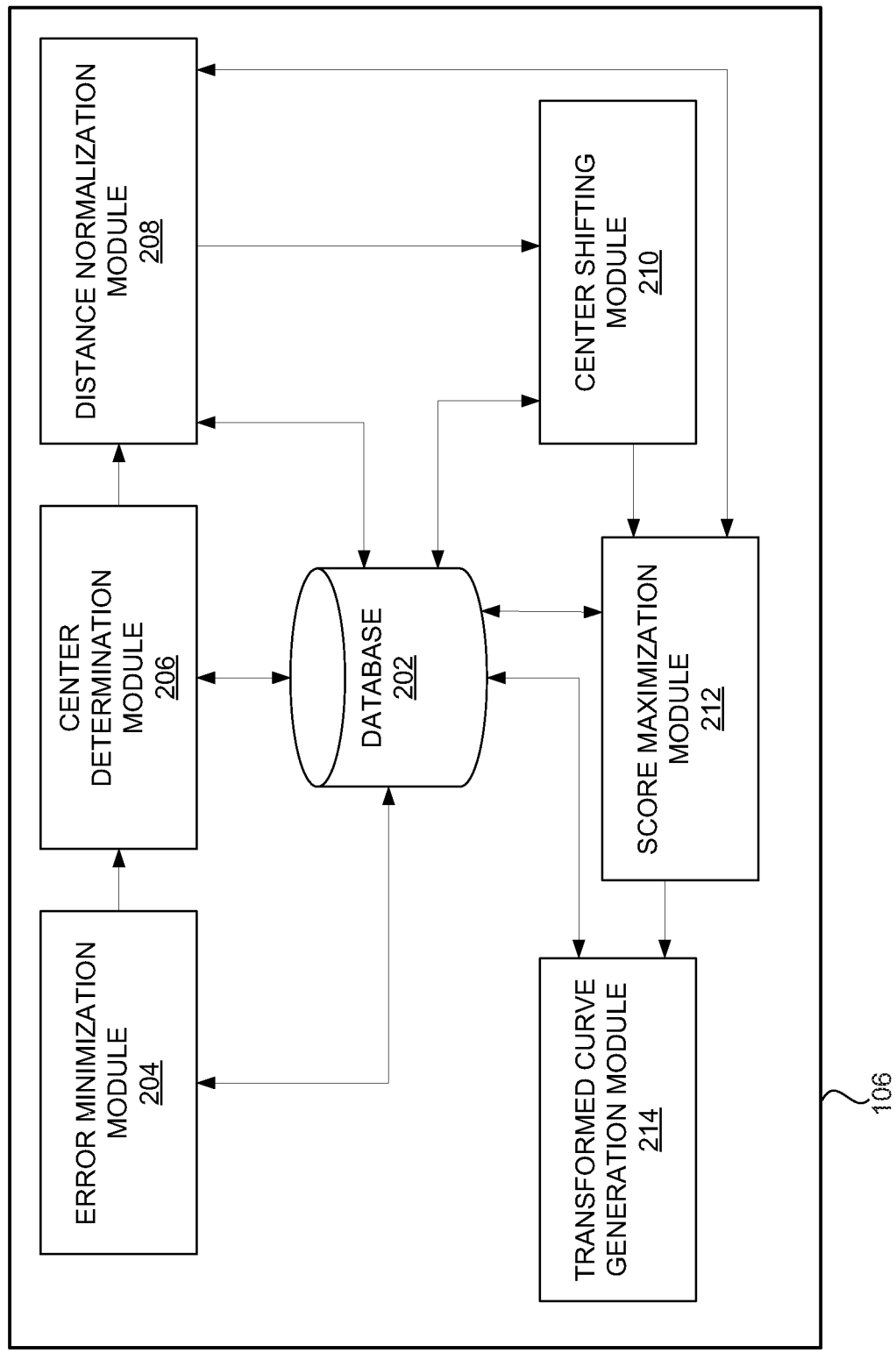
FIG. 2 illustrates an exploded view of the predictive probability system of FIG. 1, according to an embodiment.

FIG. 2 illustrates an exploded view of the predictive probability system 106 of FIG. 1 according to an embodiment herein. The predictive probability system 106 includes a database 202, an error minimization module 204, a center determination module 206, a distance normalization module 208, a center shifting module 210, a score maximization module 212, and a transformed curve generation module 214. In an embodiment, the error minimization module 204 minimizes a distance between a) the ideal 1 probability and a predicted probability value from among the plurality of positive class predictions, and b) the ideal zero probability and a predicted probability value from among the plurality of negative class predictions. In an embodiment, the error minimization module 204 defines an error metric for training the machine learning model. In an embodiment, the error metric includes a) a distance from the ideal zero probability of the plurality of negative class predictions or b) a distance from the ideal one probability of the plurality of positive class predictions. The error minimization module 204 minimizes the error metric for shifting one or more probability values in the machine learning model closer to one of: the ideal zero probability and the ideal one probability.

The machine learning models trained to minimize the error metric will have predicted probability values shifted towards 0 (ideal 0 probability) and 1 (ideal 1 probability), leading to a valley (as exemplarily illustrated further in the description of FIGS. 3A and 3B) in the middle of the transformed probability curve, thereby achieving a desired shape of the transformed probability curve. In an embodiment, for positive class predictions, error is computed as 1−predicted probability and for negative class predictions, error is computed as predicted probability−0.

In an embodiment, the center determination module 206 maximizes a distance of a plurality of predicted probability values from a center of the predictive probability curve. The center determination module 206 maximizes the distance by establishing the center of the predictive probability curve based on an ideal separation point for the plurality of positive class predictions and the plurality of negative class predictions using one or more statistical techniques as an original center.

In an embodiment, the center determination module 206 establishes a center of the predictive probability curve ($P_{center}$) such that the center is an ideal separation point for predicted failures and predicted success cases. In an embodiment, several statistical methods may be used to pick the ideal separation point for predicted failures and success cases as $P_{center}$ (typically different from the ideal 0.5 center) by optimizing for a $F_\beta$ score which may be defined using precision & recall metrics. In an embodiment, the precision and the recall are defined in terms of false negatives ($F_n$), false positives ($F_p$) and true positives ($T_p$). The false negative $F_n$ includes a number of records which belong to the positive class but are incorrectly predicted as negative class, the false positive $F_p$ includes number of records which belong to the negative class but are incorrectly predicted as positive class, and true positives $T_p$ includes number of records that belong to the positive class and are correctly predicted as positive class. The precision and recall are defined by equations (1) and (2) below:

$$\text{precision} = T_p/(T_p + F_p) \quad (1)$$

$$\text{recall} = T_p/(T_p + F_n) \quad (2)$$

In an embodiment, precision captures the proportion of true positives in all predicted positives and recall captures the proportion of true positives in all actual positives. In an embodiment, maximizing precision implies minimizing false positives and maximizing recall implies minimizing false negatives. In order to optimize for both precision & recall together, an $F_1$ score may be defined as the harmonic mean of precision and recall given by equation (3):

$$\begin{aligned}F1 &= 1/(((1/2)*(1/\text{Precision})) + ((1/2)*(1/\text{Recall}))) \\ &= 2*((\text{Precision}*\text{Recall})/(\text{Precision} + \text{Recall}))\end{aligned} \quad (3)$$

In an embodiment, instead of giving precision and recall equal weightage (½ and ½) as in the F1 score, recall may be weighed β times precision to use weights of 1/(1+β) and β/(1+β) to define $F_\beta$ as given by equation (4):

$$\begin{aligned}F_\beta &= 1/((1/(1+\beta))*(1/\text{Precision}) + (\beta/(1+\beta))*(1/\text{Recall})) \\ &= (1+\beta)*((\text{Precision} + \text{Recall})/((\beta*\text{Precision}) + \text{Recall}))\end{aligned} \quad (4)$$

The value of β depends on a problem domain and may be set based on an understanding of the costs of misclassification. In several exemplary scenarios, such as cancer detection or credit card fraud detection, lower false negatives may be desired as the cost of missing out genuine cancer cells or credit card fraud may be high, and accordingly β>1 for both the exemplary scenarios. Between the two, the cost of missing out genuine cancer cells may be relatively much higher than missing out on credit card fraud, and accordingly β may be set much higher for the cancer detection use case compared to the credit card fraud use case. Based on a value of cost of a false negative prediction (cost ($F_n$)) and a cost of false positive prediction (cost ($F_p$)), the center determination module 206 sets β based on equation (5):

$$\beta = \text{Cost}(F_n)/\text{Cost}(F_p) \quad (5)$$

In an embodiment, if the data set is skewed, a compensation factor is additionally introduced to counteract the skew and $\beta$ is given by the following equation (6):

$$\beta = (1 + \log(\text{No. of Negative Class Records/No. of Positive Class Records})) * (\text{Cost}(F_n)/\text{Cost}(F_p)) \quad (6)$$

Note, the terms "positive class records and negative class records" are used interchangeably with the terms "positive class predictions" and "negative class predictions" respectively, throughout the description. Based on the above value of $\beta$, the cost ($F_n$) is amplified if there are significantly more negative class predictions than the positive class predictions and the cost ($F_p$) is amplified if there are more positive class predictions than the negative class predictions. In an embodiment, the compensation factor is determined based on the observation that the predicted probabilities are biased towards a class with a larger number of prediction records and so the cost of a false prediction record in the class should be higher. For example, in a change success scenario, most changes may be successful and there may be less than 5% failures implying a large number of positive class predictions. Consequently, the predicted change success probabilities tend to be very close to 1. Since cost ($F_p$) is higher than cost ($F_n$), meaning a cost of incorrectly predicting change success is higher than a cost of incorrectly failing to predict change success, the center determination module 206 sets $\beta<1$ and given the large number of positive class records, $\beta$ is modified to be lower to counteract a skew in predicted probabilities towards the positive class. In an embodiment, if the probability of change failure is being predicted instead of change success, the positive and negative classes are swapped and cost ($F_n$) may be higher than cost ($F_p$) and consequently $\beta>1$ and $\beta$ may be modified to be higher, given the large number of negative class records. The score maximization module 212 maximizes the $F_\beta$ score.

In an embodiment, a distance normalization module 208 computes a normalized distance for the positive class predictions and the negative class predictions from the original center. The distance captures how far away the predictions are from the center—the higher the average distance the better, as higher distances from the center reflect the desired valley shaped curve. The distances need to be normalized to account for the fact that the positive and negative classes are commonly different in width as $P_{original\_center}$ is typically not 0.5. Given $P_{original\_center}$ the unnormalized distance may be defined by equations (7) and (8):

$$\text{Positive class records: distance} = P_i - P_{original\_center} \quad (7)$$

$$\text{Negative class records: distance} = P_{original\_center} - P_i \quad (8)$$

If the records are misclassified, the distance can be negative. To create a balanced metric based on the above distances, it may be realized that as $P_{original\_center}$ is likely not 0.5, the distances must be normalized by the positive and negative class width, the distance normalization module 208 determines the normalized distance based on equation (9) for positive class records and based on equation (10) for negative class records:

$$\text{normalized distance} = (P_i - P_{original\_center})/P_{original\_center} \quad (9)$$

$$\text{normalized distance} = (P_{original\_center} - P_i)/P_{original\_center} \quad (10)$$

The above transformation normalizes correctly classified records between 0 and 1, however the misclassified records with negative distances may not be normalized correctly. Instead, in an embodiment, the distances may be normalized based on equations (11) and (12):

When $P_i \geq P_{original\_center}$, $$\text{normalized distance} = (P_i - P_{original\_center})/(1 - P_{original\_center}) \quad (11)$$

When $P_i < P_{original\_center}$, $$\text{normalized distance} = (P_{original\_center} - P_i)/P_{original\_center} \quad (12)$$

When the normalized distance is computed based on equations (11) and (12), the normalized distance is always between 0 and 1. However, in order to differentiate misclassified records that are in the wrong direction from the center such as, positive class records less than $P_{original\_center}$ and negative class records greater than $P_{original\_center}$, the distance sign may be flipped so that the distance is between −1 to 1. In such instances, the final normalization function is given by equations (13) to (16):

A) For positive class records:

1) If $P_i \geq P_{original\_center}$, $$\text{normalized distance} = (P_i - P_{original\_center})/(1 - P_{original\_center}) \quad (13)$$

2) If $P_i < P_{original\_center}$, $$\text{normalized distance} = -(P_{original\_center} - P_i)/P_{original\_center} \quad (14)$$

B) For negative class records:

1) If $P_i < P_{original\_center}$ $$\text{normalized distance} = (P_{original\_center} - P_i)/P_{original\_center} \quad (15)$$

2) If $P_i \geq P_{original\_center}$, $$\text{normalized distance} = (P_i - P_{original\_center})/(1 - P_{original\_center}) \quad (16)$$

The distance normalization module 208 uses the average normalized distances to create a distance maximization $F_\beta$ score. The $F_\beta$ score weighs one of: a) a distance of the positive class predictions higher than distance of the negative class predictions, upon determining that correctly classifying positive class predictions is more significant than correctly classifying negative class predictions, and b) a distance of the negative class predictions higher than distance of the positive class predictions upon determining that correctly classifying negative class predictions is more significant than correctly classifying positive class predictions. For change failure prediction, as it is more important to determine the failures (positive class given, probability of failure is being predicted) correctly, the positive class may be weighed $\beta$ times higher than the negative class and the distance maximization $F_\beta$ score is given by equation (17):

$$F_\beta = (1 + (\text{Average Negative Class Normalized Distance} * \text{Average Positive Class Normalized Distance})/(\beta * \text{Average Negative Class Normalized Distance} + \text{Average Positive Class Normalized Distance})) \quad (17)$$

The score maximization module 212 maximizes the distance maximization $F_\beta$ score. The model that is trained to maximize such a distance maximization $F_\beta$ may lead to valley shaped curves as the model is effectively trained to increase the distance from the center in the right direction.

In another embodiment, for maximizing the distance, the center shifting module 210 shifts the center of the predictive probability curve to 0.5 and computes distance of the positive class predictions and the negative class predictions from the shifted center. The shifting of center may be achieved by adjusting each probability $P_i$ to $P_{adjusted}$ using the center of the original curve $P_{original\_center}$ as follows:

For probabilities$>=P_{original\_center}$ $$P_{adjusted}=0.5+(1/2)*((P_i-P_{original\_center})/(1-P_{original\_center})) \quad (18)$$

and for probabilities$<P_{original\_center}$ $$P_{adjusted}=(1/2)*(P_i/P_{original\_center}) \quad (19)$$

The shifting of center based on equations (18) and (19) above, guarantees that probabilities$<P_{original\_center}$ are between 0 and 0.5 and probabilities$>=P_{original\_center}$ are between 0.5 and 1 and also preserves valleys as, if there are no points near the $P_{original\_center}$ consequently there will be no points near the adjusted 0.5 center. As the two sides around $P_{original\_center}$ are scaled to be around the new 0.5 center, the curve on the originally wider side will become steeper as the points are scaled to fit within a smaller 0.5 interval, while the curve on the narrower side will become less steep as the points are expanded to fit within a larger 0.5 interval. With 0.5 as the center, the shifted center distance may be calculated based on following equations (20) and (21):

For positive class records:

$$\text{shifted center distance} = P_{i-adjusted} - 0.5 \quad (20)$$

For negative class records:

$$\text{shifted center distance} = 0.5 - P_{i-adjusted} \quad (21)$$

The average distances with 0.5 center can be used to create a distance maximization $F_\beta$ score, The $F_\beta$ score weighs one of: a) a distance of the positive class predictions higher than distance of the negative class predictions, upon determining that correctly classifying positive class predictions is more significant than correctly classifying negative class predictions, and b) a distance of the negative class predictions higher than distance of the positive class predictions upon determining that correctly classifying negative class predictions is more significant than correctly classifying positive class predictions. For change failure prediction, as it is more important to get the failures (that includes positive class predictions given that the probability of failure is being predicted) right, the positive class predictions may be weighed $\beta$ times higher than the negative class predictions and the distance maximization $F_\beta$ score is given by equation (22):

$$F_\beta = (1+\beta)*((\text{Average Negative Class Distance}*\text{Average Positive Class Distance})/(\beta*\text{Average Negative Class Distance}+\text{Average Positive Class Distance})) \quad (22)$$

The score maximization module 212 maximizes the distance maximization $F_\beta$ score. Training the model to maximize such a distance maximization $F_\beta$ score may lead to valley shaped curves as the ML model is being effectively trained to increase the distance from the center in the right direction. In an embodiment, the transformed curve generation module 214 generates the transformed probability curve with a valley separating the plurality of positive class predictions from the plurality of negative class predictions based on one of: 1) minimizing a distance between: a) the ideal one probability and a predicted probability value of the plurality of positive class predictions; and b) the ideal zero probability and a predicted probability value of the plurality of negative class predictions, performed by the error minimization module 204, and 2) maximizing an average distance of a plurality of predicted probability values from a center of the predictive probability curve determined by the center determination module 206 and one of a) the distance normalization module 208, or b) by the center shifting module 210.

Figure 3A:
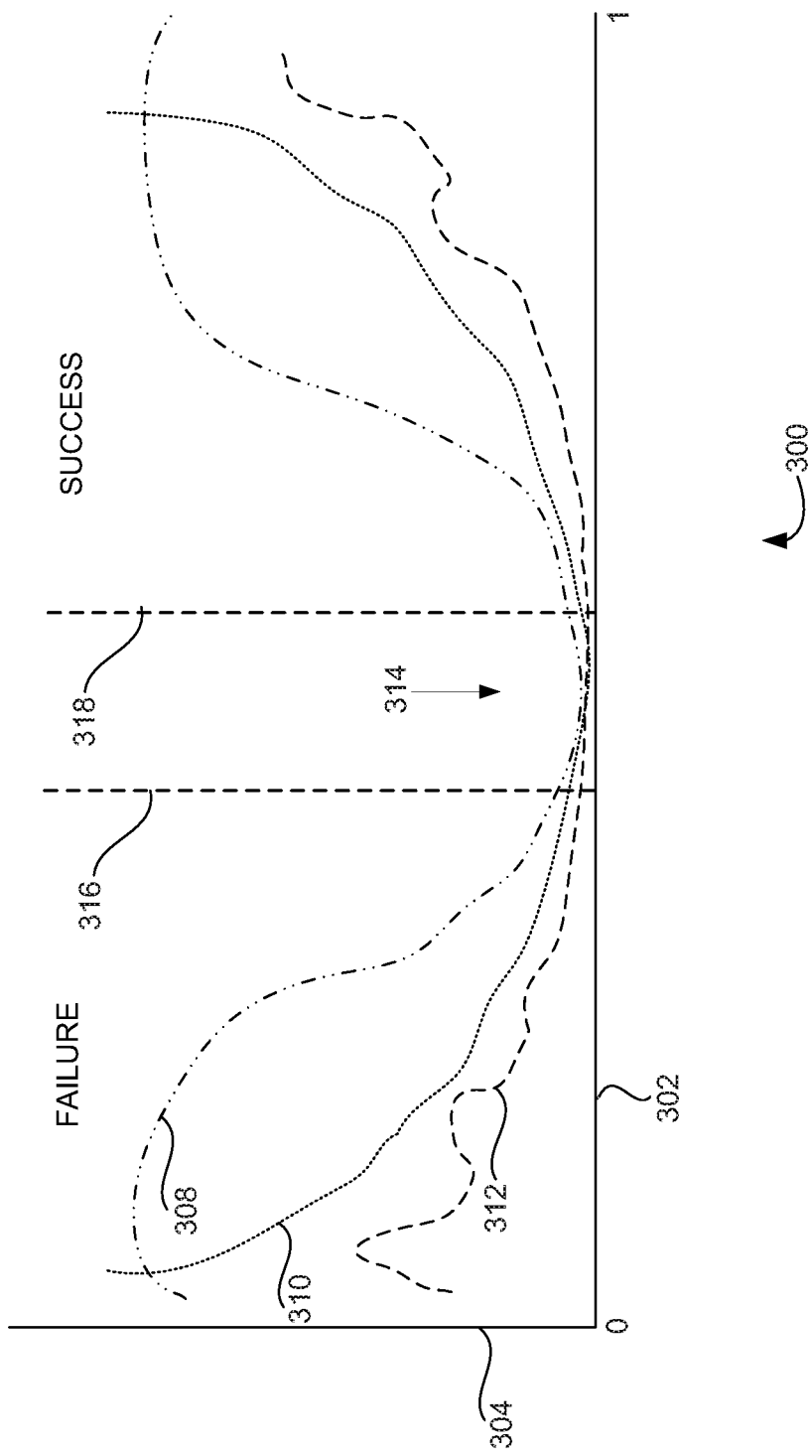
FIGS. 3A and 3B depict exemplary transformed probability curves, in accordance with an embodiment.
Figure 3B:
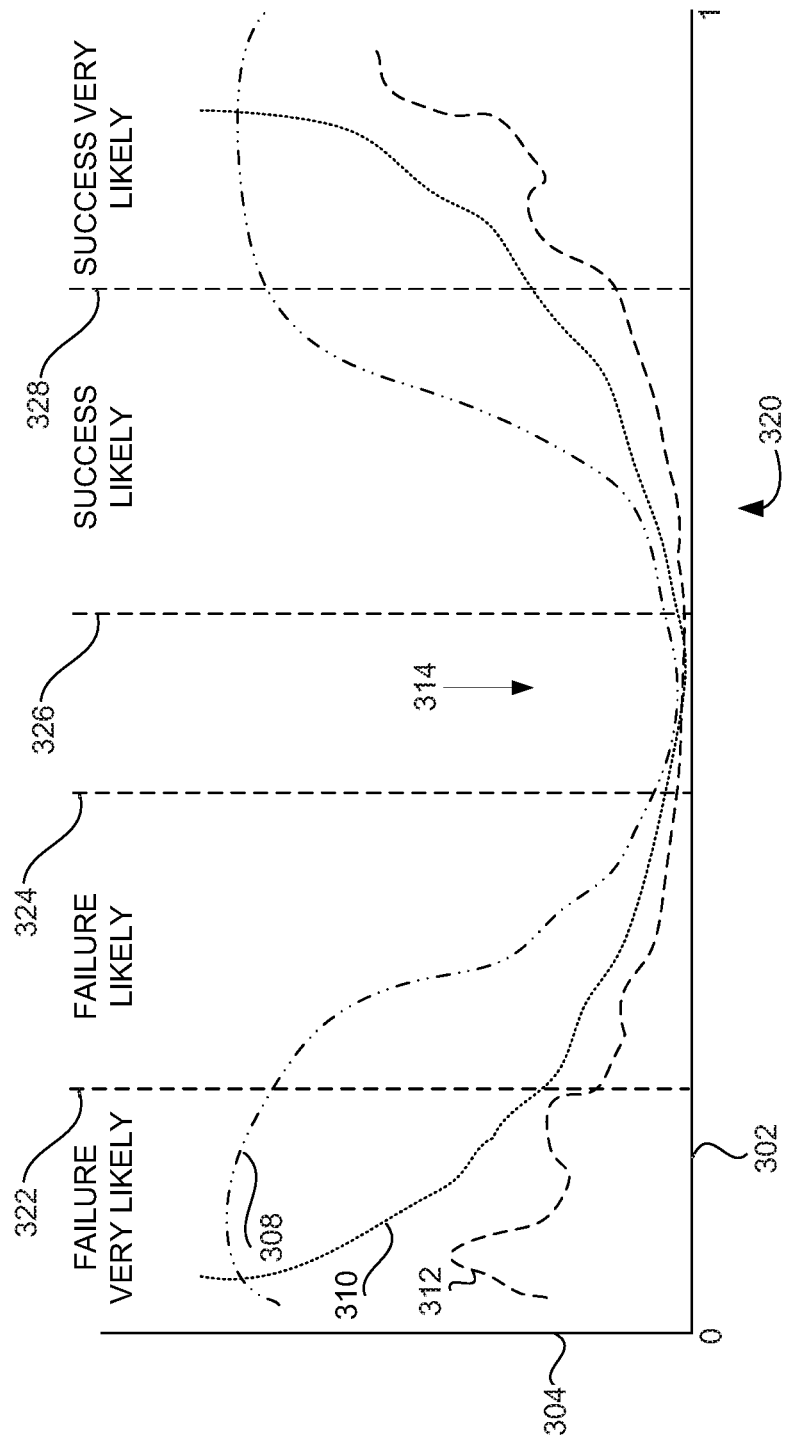

FIGS. 3A and 3B depict exemplary transformed curves 300 and 320, in accordance with an embodiment. More particularly, FIG. 3A illustrates three curves, curve 1 (308), curve 2 (310), and curve 3 (312), each of the three curves obtained by plotting various probability values from 0 to 1 along X-axis 302 against a number of instances with each probability plotted along the Y-axis 304. The transformed curve may be symmetrical like curve 1 (308) or curve 2 (310) or asymmetrical like curve 3 (312). Near the 0 or 1 probabilities, the transformed curve may have a concave shape like curve 1 (308), a convex shape like curve 2 (310) or a mixed shape like curve 3 (312). Also, as depicted in the FIG. 3A, a portion of the transformed curves between 0 probability and value corresponding to dotted line 316 indicates failure cases and a portion of the transformed curves between 1 probability and a value corresponding to dotted line 318 indicates success cases. However, a common characteristic of all the three transformed curves is a flat valley 314 in the center between the success cases and the failure cases, that enables a user to easily distinguish between the failure cases from the success cases with the valley 314.

In an embodiment, as depicted in FIG. 3B, the success and failure cases may be further split into success very likely (the portion of the curves between the 1 probability and a value corresponding to dotted line 328), success likely (the portion of the curves between a value corresponding to the dotted line 328 and a value corresponding to the dotted line 326), failure likely (the portion of the curves between a value corresponding to the dotted line 324 and a value corresponding to dotted line 322), failure very likely (the portion of the curves between the 0 probability and a value corresponding to dotted line 322).

Figure 4A:
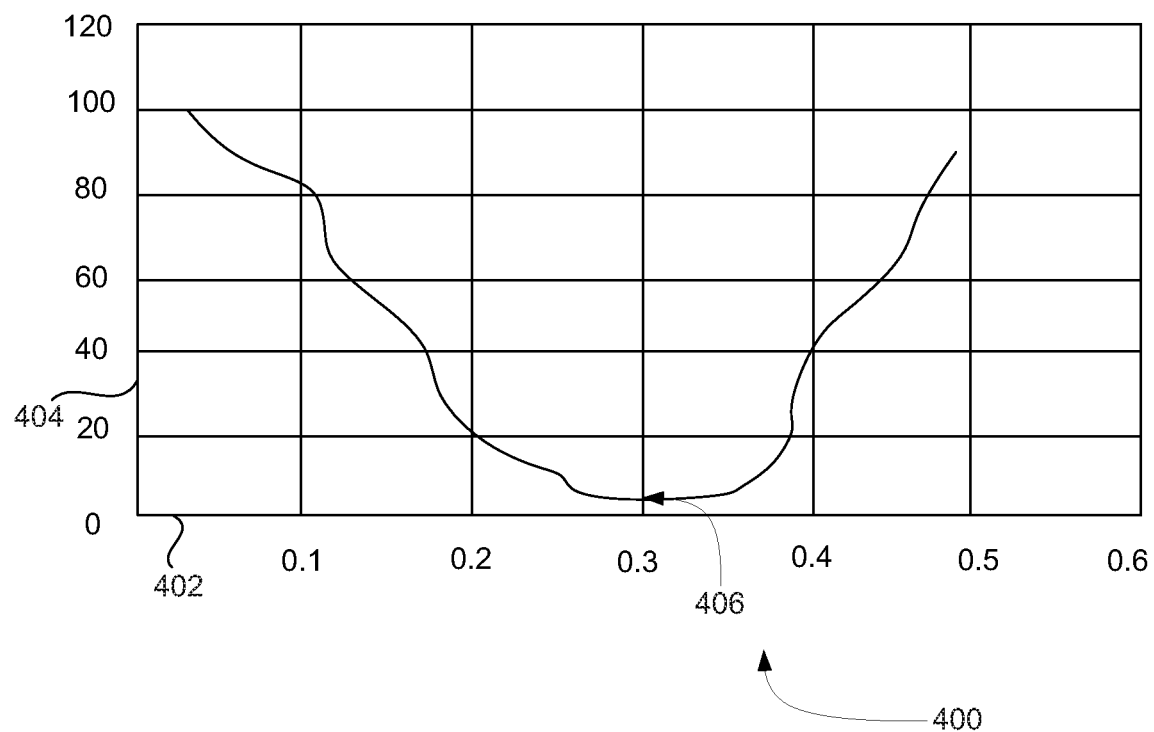
FIGS. 4A through 4C depict shifting center of an example predictive probability curve, in accordance with an embodiment.
Figure 4B:
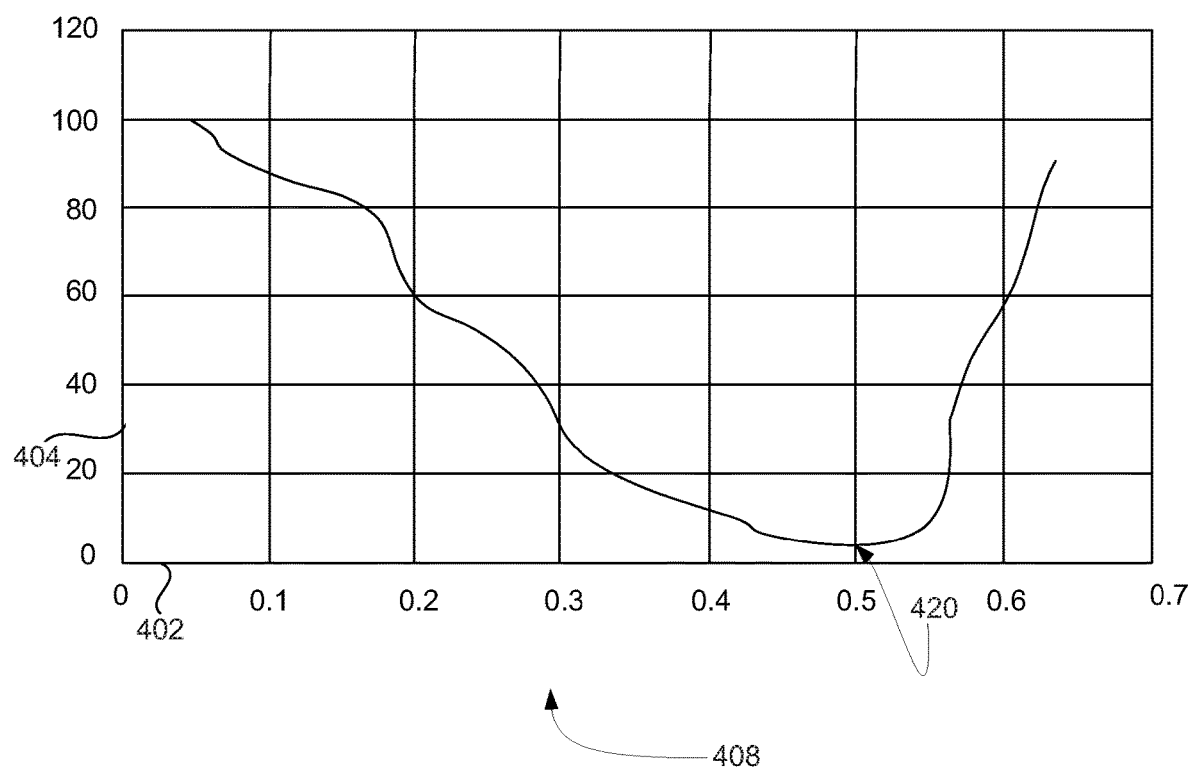
Figure 4C:
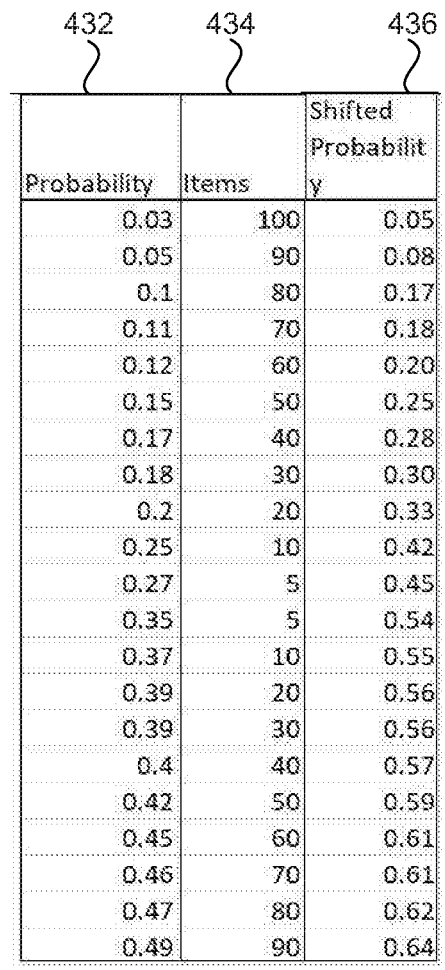
Figure 4C:

FIGS. 4A through 4C depict the center shifting of an example predictive probability curve using the predictive probability system 106 disclosed herein, in accordance with an embodiment. FIG. 4A depicts a first exemplary predictive probability curve 400 obtained by plotting a plurality of probability values along the X-axis 402 against a plurality if items along the Y-axis 404. As shown in FIG. 4A a center (406) of the exemplary predictive probability curve 400 is close to 0.3. FIG. 4B depicts a second exemplary predictive probability curve 408 obtained by shifting center of the first predictive probability curve 400 to 0.5 (indicated by arrow 420), using the center shifting module 210 of FIG. 2. FIG. 4C depicts a tabular structure 430 listing a plurality of probability values 432, the corresponding number of items with that probability 434, and shifted probability values 436 corresponding to each of the probability values 432 (corresponding to predictive probability curves of FIGS. 4A and 4B). FIGS. 4A through 4C indicate that as the two sides of the respective curves around the original center (406) are scaled to be around the new 0.5 center, the curve on the originally wider side becomes steeper as the points are scaled to fit within a smaller 0.5 interval, while the curve on the narrower side becomes less steep as the points are expanded to fit within a larger 0.5 interval, but the valley around the center is preserved during the shift. The center shift preserves valleys as if there were no points near the $P_{original\_center}$ there will be no points near the adjusted 0.5 center.

Figure 5:
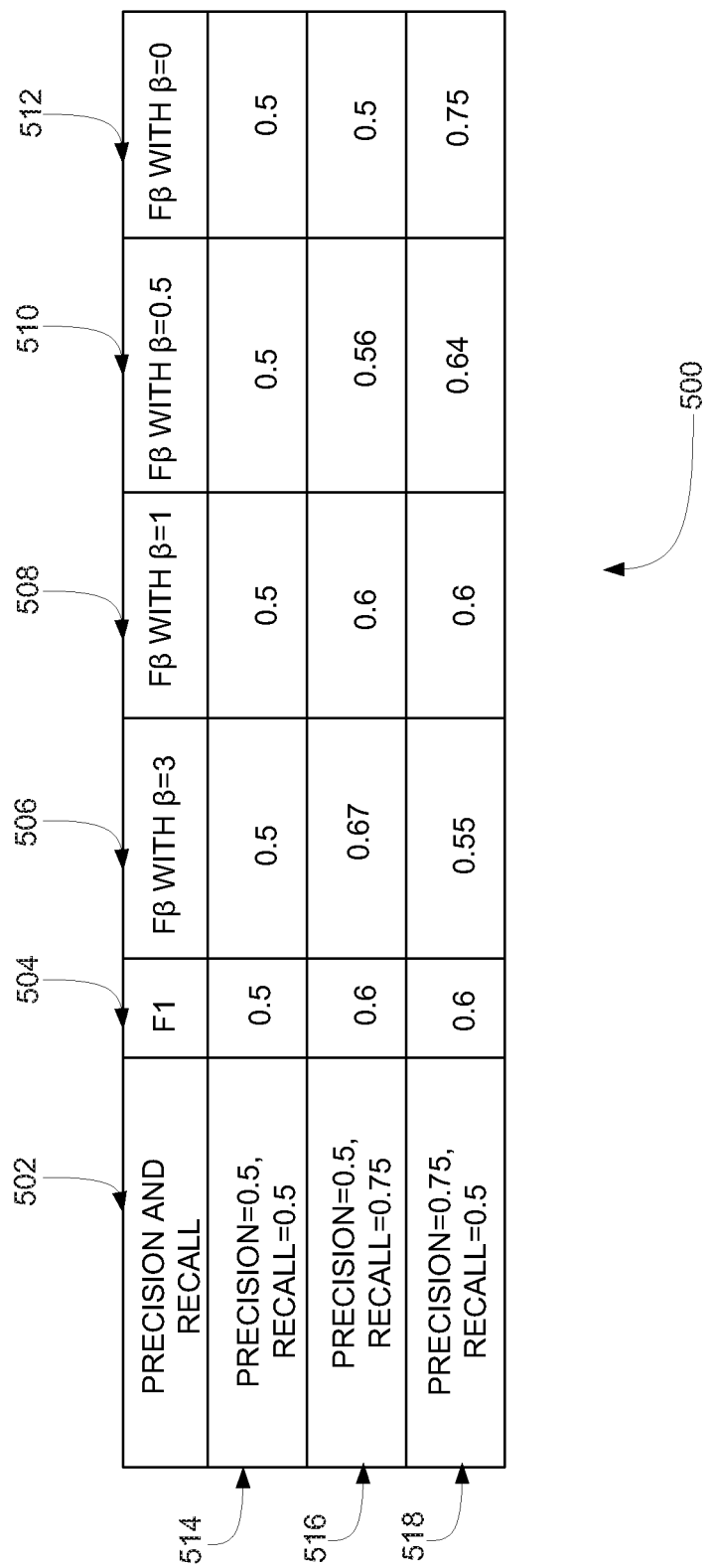
FIG. 5 illustrates a difference between $F_1$ and $F_\beta$ corresponding to different values of $\beta$, according to an embodiment herein.

FIG. 5 illustrates a tabular column 500 depicting a difference between $F_1$ and $F_\beta$ for different values of beta, in accordance with an embodiment. As depicted in FIG. 5, a column 502 enumerates various values for the precision and recall, a column 504 enumerates corresponding values of $F_1$ for each value of precision and recall, and columns 506-512 enumerate different values of $F_\beta$ for $\beta=3$, $\beta=1$, $\beta=0.5$. and $\beta=0$ respectively for each of the values of precision and recall along rows 514 to 516. In an embodiment, in row 514, when precision and recall are both 0.5, $F_1=F_\beta=0.5$. In row 516, when precision=0.5 and recall=0.75, or when recall is higher than precision, $F_\beta$ is higher than $F_1$ for $\beta>1$ and less than $F_1$ for $\beta<1$. In row 518, when precision=0.75 and recall=0.5 or when precision is higher than recall, $F_\beta$ is lower than $F_1$ for $\beta>1$ and higher than $F_1$ for $\beta<1$. In column 512, for $\beta=0$, $F_\beta$ is the same as precision. As $\beta\to\infty$, $F_\beta\to$recall. Negative $\beta$ values are not meaningful as for negative $\beta$ when $|\beta*\text{precision}|=$recall the function will switch from $-\infty$ to $+\infty$, so sometimes $F_\beta$ is written with $\beta^2$ to explicitly eliminate negative values. The rate of change of $F_\beta$ with respect to $F_\beta$ is $\beta$ times the rate of change of $F_\beta$ with respect to $F_p$ as recall is weighed $\beta$ times the precision.

Various embodiments of the systems and methods disclosed herein may be used to make predicted probabilities for binary outcomes that are intuitive (close to ends of the probability range 0-1). Examples of predictions with binary outcomes include success/failure, fraud/no fraud, cancerous/non-cancerous, fake/legitimate, good/bad, and the like. Each binary outcome prediction can have associated workflows, for example for the credit card fraud detection scenario, the workflow could be to automatically approve a transaction if fraud probability is below the acceptable threshold, request additional verification, for example pin/message/phone confirmation if fraud probability is moderate, and reject transaction if fraud probability is high. Similarly, for the cancer detection scenario, the workflow could be indicating no cancer if cancer probability is below an acceptable threshold, suggesting additional tests and doctor review if cancer probability is moderate, and confirm cancer if predicted cancer probability is high. Various embodiments of the system and methods disclosed herein enable organizations to save huge amount of time and resources by avoiding investment in development of custom algorithms to get intuitive probabilities, or invest resources in presenting probabilities categorized into buckets to make them user intuitive.

Figure 6:
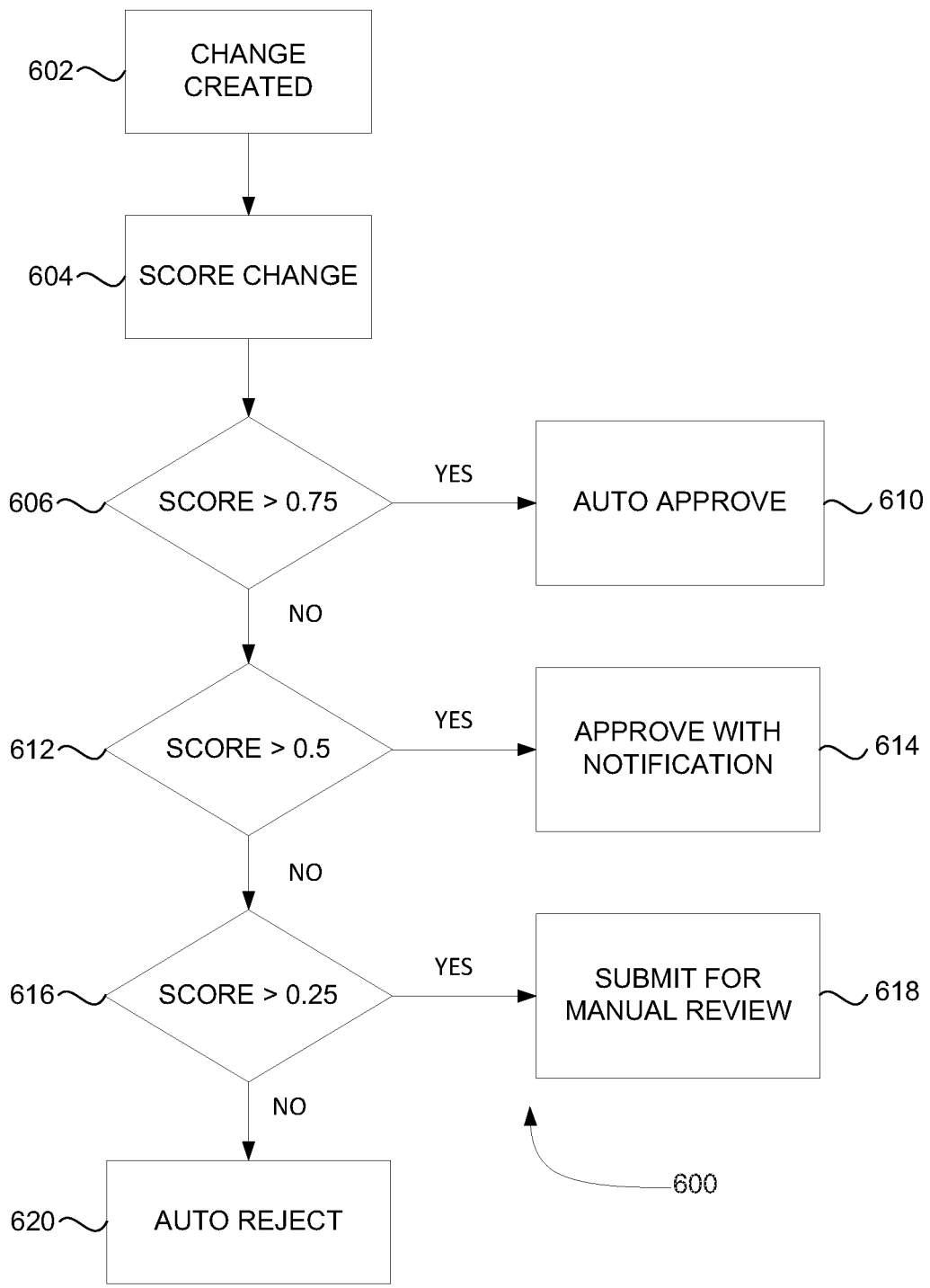
FIG. 6 depicts an example workflow of change approval enabled by various methods and systems disclosed, according to an embodiment herein.

Additionally, various systems and methods disclosed herein facilitate automated workflows based on one or more rules conditioned on a distribution of the predicted probabilities obtained from the trained machine learning model. FIG. 6 depicts an exemplary automated workflow 600, in accordance with an exemplary embodiment. In an exemplary embodiment, an organization relying on change success/failure predictions may have automated workflows that take different actions based on predicted probability. For example, the change approval workflow may state if a likelihood of success is greater than 0.75 then the change is auto approved, if the likelihood of success is between 0.5 and 0.75 then it is approved but a notification is generated for review, if the likelihood of success is between 0.25 and 0.5 then it is put in the manual review queue for approval and if the likelihood of success is less than 0.25 then the change is rejected. Such workflow rules are typically based on intuitive expectation of predicted probabilities so require an arbitrary shaped predictive probability curve to be transformed into one matching an intuition of an average user.

FIG. 6 depicts a change approval workflow 600. At step 602, a change is created. At step 604, a score for the change is generated. At step 606, if the score is greater than 0.75, then the change is automatically approved at step 610, else at step 612 if the score is greater than 0.5, then the change is approved with a notification at step 614, else if at step 616 the score is greater than 0.25, the change is submitted for manual review at step 618, else the change is automatically rejected at step 620. Without the application of techniques described in this invention, the predicted probabilities would not be spread across the 0 to 1 range and instead would likely be clustered in different narrow bands which are hard to establish a priori, making automation of workflows conditioned on predicted probability ranges impossible. With the application of techniques described in this invention, many steps of the change approval workflow can be automated thereby reducing the processing time, increasing efficiency, eliminating redundant operations and reduce errors inherent in manual processing.

Steps 610, 614, and 620 indicate automation of work that was previously performed manually. Steps 610 and 620 indicate full automation while step 614 indicates partial automation with optional manual review work. For efficiency and near real-time automated categorization of large volume of changes by workflow rules, having intuitive predictive probabilities to facilitate automatic classification of changes is highly preferred over an approach based on non-intuitive probabilities that requires manual review of predicted probabilities for splitting into different workflow categories, as an automated approach can significantly cut down the time required for initial review of changes and can also auto approve or auto reject many changes without any human intervention. Additionally, the automated approach (such as the one illustrated in FIG. 6) may reduce the workload of a group tasked with reviewing changes, by automatically categorizing the changes based on workflow rules and eliminating those that do not require manual intervention, which in turn results in improved efficiency for the organization.

Figure 7:
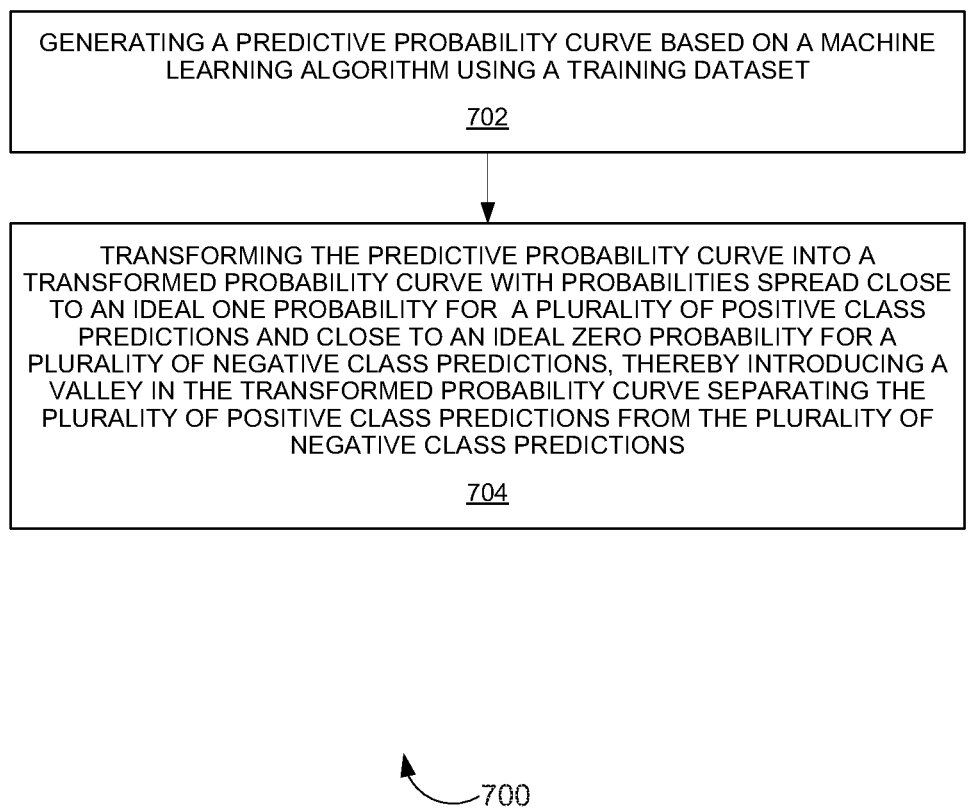
FIG. 7 depicts a flow diagram that illustrates a method training a machine learning model to automatically generate at least one positive class prediction close to an ideal one probability and at least one negative class prediction close to an ideal zero probability, according to some embodiments herein.

FIG. 7 depicts a flow diagram that illustrates a processor-implemented method of training a machine learning model to automatically generate at least one positive class prediction close to an ideal one probability and at least one negative class prediction close to an ideal zero probability, according to some embodiments herein. At step 702, the method includes generating a predictive probability curve based on a machine learning algorithm using a training dataset. At step 704, the method includes transforming the predictive probability curve into a transformed probability curve with probabilities spread close to the ideal one probability for a plurality of positive class predictions and close to the ideal zero probability for a plurality of negative class predictions, thereby introducing a valley in the transformed probability curve separating the plurality of positive class predictions from the plurality of negative class predictions. In an embodiment, the transforming includes minimizing a distance between: a) the ideal one probability and a predicted probability value of the plurality of positive class predictions; and b) the ideal zero probability and a predicted probability value of the plurality of negative class predictions.

In an embodiment, minimizing the error metric includes a) defining an error metric for training the machine learning model, where the error metric includes one of: a distance from the ideal zero probability of the plurality of negative class predictions and a distance from the ideal one probability of the plurality of positive class predictions and b) minimizing the error metric for shifting one or more probability values in the machine learning model closer to one of: the ideal zero probability and the ideal one probability.

In another embodiment, transforming includes maximizing a distance of a plurality of predicted probability values from a center of the predictive probability curve. In an embodiment, maximizing the distance includes establishing a center of the predictive probability curve based on an ideal separation point for the plurality of positive class predictions and the plurality of negative class predictions using one or more statistical techniques as an original center and performing one of: a) computing a normalized distance for each of the plurality of positive class predictions and the plurality of negative class predictions from the original center and b) shifting the original center of the predictive probability curve to 0.5 as a shifted center and computing a distance for each of the plurality of positive class predictions and the plurality of negative class predictions from 0.5 as a shifted center distance, and maximizing a score created based on an average of one of: the normalized distances and the shifted center distances.

The score weighs one of: a) a distance of the positive class predictions higher than distance of the negative class predictions, upon determining that correctly classifying positive class predictions is more significant than correctly classifying negative class predictions, and b) a distance of the negative class predictions higher than distance of the positive class predictions upon determining that correctly classifying negative class predictions is more significant than correctly classifying positive class predictions, thereby maximizing the distance of the plurality of predicted probability values from the original center or the shifted center of the predictive probability curve.

Figure 8A:
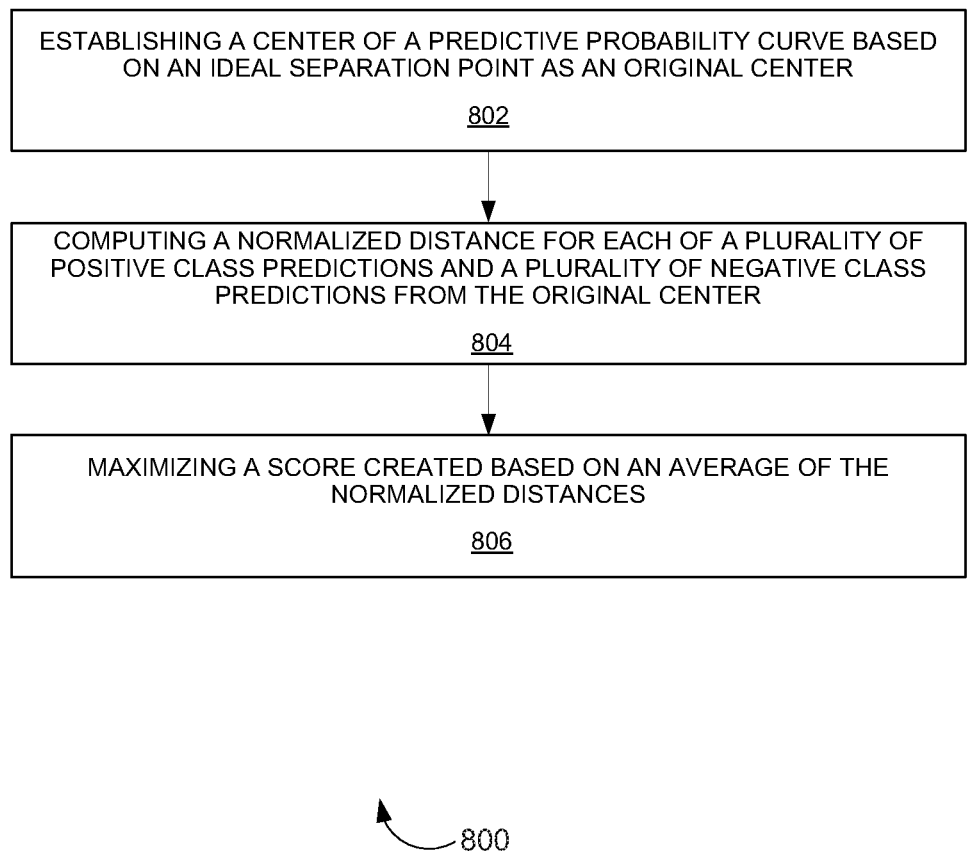
FIG. 8A depicts a flow diagram that illustrates a method of transforming the predictive probability curve into a transformed probability curve by maximizing a distance of a plurality of predicted probability values from a center of the predictive probability curve, in accordance with one embodiment.

FIG. 8A depicts a flow diagram 800 that illustrates a method of transforming the predictive probability curve into a transformed probability curve by maximizing a distance of a plurality of predicted probability values from a center of the predictive probability curve, in accordance with one embodiment. In an embodiment at step 802, a center of the predictive probability curve is established based on an ideal separation point for the plurality of positive class predictions and the plurality of negative class predictions using one or more statistical techniques as an original center. An example technique of establishing the center is described above along with description of FIG. 2. At step 804, a normalized distance is computed for each of the plurality of positive class predictions and the plurality of negative class predictions from the original center. At step 806, a score (distance maximization $F_\beta$ score) created based on an average of the normalized distances is maximized.

Figure 8B:
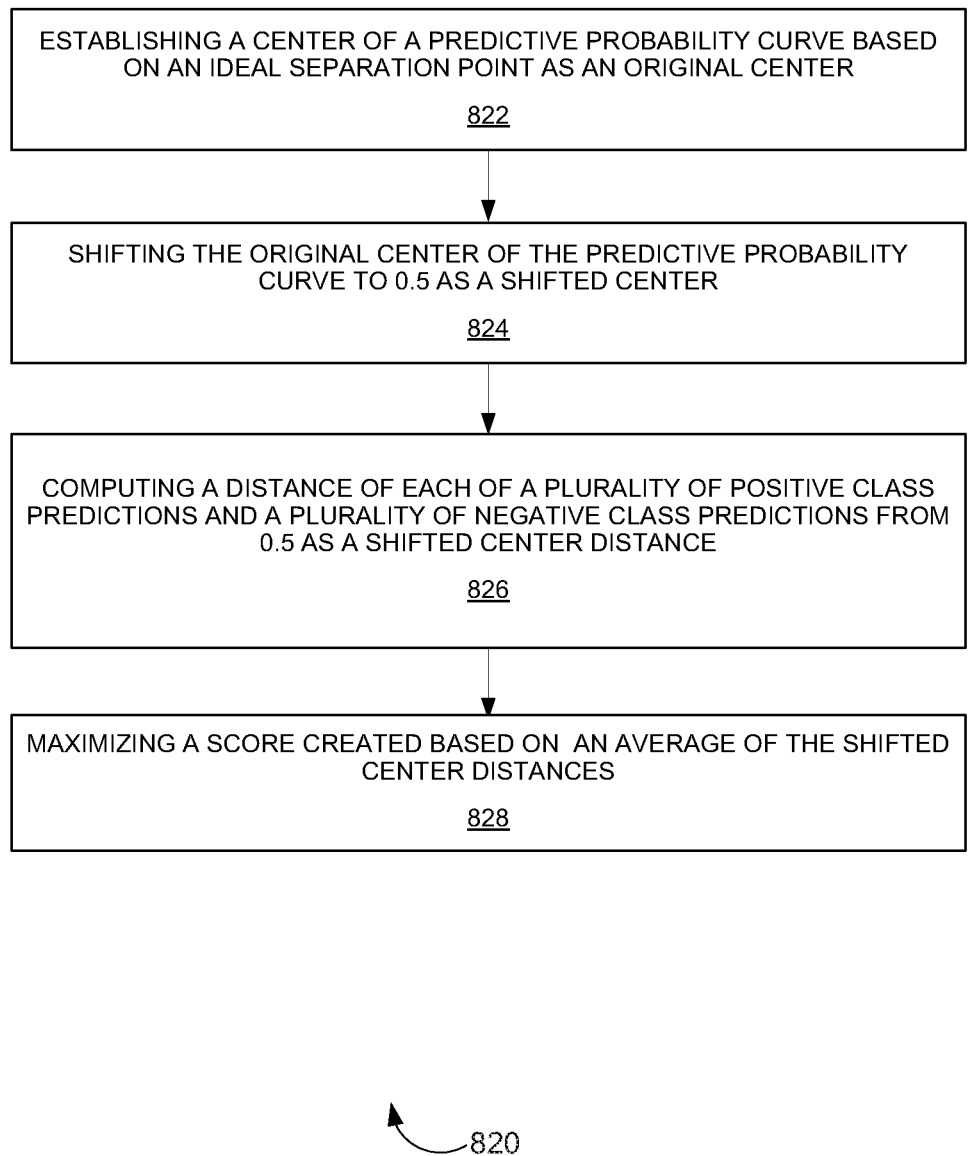
FIG. 8B depicts a flow diagram that illustrates a method of transforming the predictive probability curve into a transformed probability curve by shifting the center to 0.5 and maximizing a distance of a plurality of predicted probability values from the shifted center of the predictive probability curve, in accordance with another embodiment.

FIG. 8B depicts a flow diagram 820 that illustrates a method of transforming the predictive probability curve into a transformed probability curve by maximizing a distance of a plurality of predicted probability values from a center of the predictive probability curve, in accordance with another embodiment. In an embodiment at step 822, a center of the predictive probability curve is established based on an ideal separation point for the plurality of positive class predictions and the plurality of negative class predictions using one or more statistical techniques as an original center. An example technique of establishing the center is described above along with description of FIG. 2. At step 824, the original center of the predictive probability curve is shifted to 0.5. At step 826, a distance of the plurality of positive class predictions and the plurality of negative class predictions from 0.5 is computed as a shifted center distance. At step 828, a score (distance maximization $F_\beta$ score) created based on an average of the shifted center distances is maximized.

The aforementioned training of machine learning model in a way that the predicted probabilities for binary outcomes are intuitive (i.e. close to the ideal 0 or 1) facilitates in real-time at least one of (1) enabling at least one automated workflow, based on one or more rules conditioned on a distribution of the predicted probabilities obtained from the trained machine learning model; and (2) correctly classifying the plurality of predicted probabilities obtained from the trained machine learning model and presenting the plurality of correctly classified predicted probabilities on a display device without further manual processing. The system as described can be used in an internet application as part of a software as a service offering for making binary outcome predictions which are easily interpretable by average end users. The system as described can also be used by an internet application for automating any needed workflows based on one or more rules conditioned on a distribution of the predicted probabilities for binary outcomes.

Figure 9:
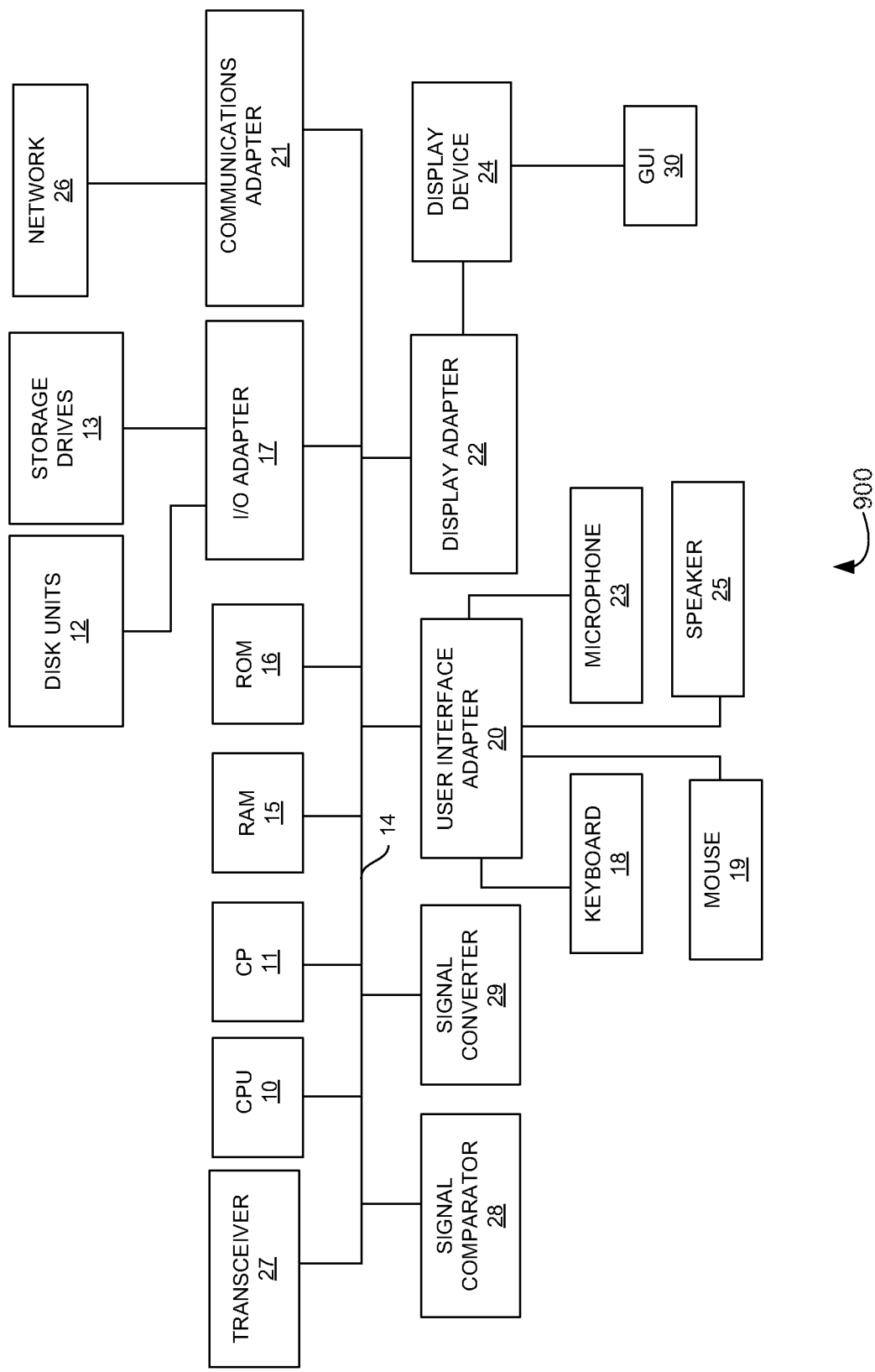
FIG. 9 is a computer system used in accordance with the embodiments herein.

A representative hardware environment for practicing the embodiments herein is depicted in FIG. 9 with reference to FIGS. 1 through 8B. This schematic drawing illustrates a hardware configuration of computer system 104 of FIG. 1, in accordance with the embodiments herein. The hardware configuration includes at least one processing device 10 and a cryptographic processor 11. The computer system 104 may include one or more of a personal computer, a laptop, a tablet device, a smartphone, a mobile communication device, a personal digital assistant, or any other such computing device, in one example embodiment. The computer system 104 includes one or more processor (e.g., the processor 108) or central processing unit (CPU) 10. The CPUs 10 are interconnected via system bus 12 to various devices such as a memory 14, read-only memory (ROM) 16, and an input/output (I/O) adapter 18. Although, CPUs 10 are depicted, it is to be understood that the computer system 104 may be implemented with only one CPU.

The I/O adapter 18 can connect to peripheral devices, such as disk units 11 and tape drives 13, or other program storage devices that are readable by the system. The computer system 104 can read the inventive instructions on the program storage devices and follow these instructions to execute the methodology of the embodiments herein. The computer system 104 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk.

Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications without departing from the generic concept, and, therefore, such adaptations and modifications should be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. One or more non-transitory computer readable storage mediums storing one or more sequences of instructions, which when executed by one or more processors, causes a machine learning model for predicting probabilities for binary outcomes to automatically generate at least one positive class prediction close to an ideal one probability and at least one negative class prediction close to an ideal zero probability, wherein a method for training the machine learning model comprises:
   generating a predictive probability curve based on a machine learning algorithm using a training dataset; and
   transforming the predictive probability curve into a transformed probability curve with probabilities spread close to the ideal one probability for a plurality of positive class predictions and close to the ideal zero probability for a plurality of negative class predictions, thereby introducing a valley in the transformed probability curve separating the plurality of positive class predictions from the plurality of negative class predictions, wherein a positive class prediction indicates a successful prediction case and a negative class prediction indicates a failed prediction case, and wherein the transforming comprises one of:
   1) minimizing a distance between: a) the ideal one probability and a predicted probability value of the plurality of positive class predictions; and b) the ideal zero probability and a predicted probability value of the plurality of negative class predictions; and
   2) maximizing a distance of a plurality of predicted probability values from a center of the predictive probability curve;
   wherein the trained machine learning model facilitates in real-time at least one of:
   1) enabling at least one automated workflow, based on one or more rules conditioned on a distribution of the predicted probabilities obtained from the trained machine learning model; and
   2) correctly classifying the plurality of predicted probabilities obtained from the trained machine learning model and presenting the plurality of correctly classified predicted probabilities on a display device.

2. The one or more non-transitory computer readable storage mediums storing one or more sequences of instructions of claim 1, wherein the minimizing comprises:
   defining an error metric for training the machine learning model, wherein the error comprises one of: a distance from the ideal zero probability of the plurality of negative class predictions, and a distance from the ideal one probability of the plurality of positive class predictions; and
   minimizing the error metric for shifting one or more probability values in the machine learning model closer to one of: the ideal zero probability and the ideal one probability.

3. The one or more non-transitory computer readable storage mediums storing one or more sequences of instructions of claim 1, wherein the maximizing comprises:
   establishing a center of the predictive probability curve based on an ideal separation point for the plurality of positive class predictions and the plurality of negative class predictions using one or more statistical techniques as an original center; and
   performing one of:
   a) computing a normalized distance for each of the plurality of positive class predictions and the plurality of negative class predictions from the original center; and
   b) shifting the original center of the predictive probability curve to 0.5 as a shifted center and computing a distance for each of the plurality of positive class predictions and the plurality of negative class predictions from 0.5 as a shifted center distance;
   maximizing a score created based on an average of one of: the normalized distances and the shifted center distances, wherein the score weighs one of: a) distance of the positive class predictions higher than distance of the negative class predictions, upon determining that correctly classifying positive class predictions is more significant than correctly classifying negative class predictions, and b) distance of the negative class predictions higher than distance of the positive class predictions upon determining that correctly classifying negative class predictions is more significant than correctly classifying positive class predictions; and
   thereby maximizing the distance of the plurality of predicted probability values from the original center or the shifted center of the predictive probability curve.

4. The one or more non-transitory computer readable storage mediums storing one or more sequences of instructions of claim 3, wherein the normalized distance is defined as:

a) for the plurality of positive class predictions:

normalized distance=$(P_i-P_{original\_center})/(1-P_{original\_center})$, upon $P_i>=P_{original\_center}$; and normalized distance=$-(P_{original\_center}-P_i)/P_{original\_center}$, upon $P_i<P_{original\_center}$; and b) for the plurality of negative class predictions:

normalized distance=$(P_{original\_center}-P_i)/P_{original\_center}$, upon $P_i<P_{original\_center}$; and normalized distance=$-(P_i-P_{original\_center})/(1-P_{original\_center})$, upon $P_i>=P_{original\_center}$; and wherein $P_i$ is the $i^{th}$ prediction of the plurality of predictions, i is a whole number, and $P_{original\_center}$ is the original center.

5. The one or more non-transitory computer readable storage mediums storing one or more sequences of instructions of claim 3, wherein the shifted center distance is defined as:

a) for the plurality of positive class predictions shifted center distance=$P_{i-adjusted}-0.5$;

b) for the plurality of negative class predictions:

shifted center distance=$0.5-P_{i-adjusted}$;

wherein for probabilities$>=P_{original\_center}$:

$P_{i-adjusted}=0.5+\frac{1}{2}*((P_i-P_{original\_center})/(1-P_{original\_center}))$;

wherein for probabilities$<P_{original\_center}$:

$P_{i-adjusted}=\frac{1}{2}*(P_i/P_{original\_center})$; and wherein $P_i$ is the $i^{th}$ prediction of the plurality of predictions, i is a whole number and $P_{original\_center}$ is the original center.

6. A system for training a machine learning model for predicting probabilities for binary outcomes to automatically generate at least one positive class prediction close to an ideal one probability and at least one negative class prediction close to an ideal zero probability, the system comprising:

a memory that stores a set of instructions and an information associated with a machine learning algorithm;

a processor that executes the set of instructions, wherein the processor is configured for training the machine learning model for predicting probabilities for binary outcomes to automatically generate the positive class prediction close to one and the negative class prediction close to zero, wherein the training comprises:

generating a predictive probability curve based on the machine learning using a training dataset; and transforming the predictive probability curve into a transformed probability curve with probabilities spread close to the ideal one probability for a plurality of positive class predictions and close to the ideal zero probability for a plurality of negative class predictions, thereby introducing a valley in the transformed probability curve separating the plurality of positive class predictions from the plurality of negative class predictions, wherein a positive class prediction indicates a successful prediction case and a negative class prediction indicates a failed prediction case, and wherein the transforming comprises one of:

1) minimizing a distance between: a) the ideal one probability and a predicted probability value of the plurality of positive class predictions; and b) the ideal zero probability and a predicted probability value of the plurality of negative class predictions; and 2) maximizing a distance of a plurality of predicted probability values from a center of the predictive probability curve;

wherein the trained machine learning model facilitates in real-time at least one of:

1) enabling at least one automated workflow, based on one or more rules conditioned on a distribution of the predicted probabilities obtained from the trained machine learning model; and 2) correctly classifying the plurality of predicted probabilities obtained from the trained machine learning model and presenting the plurality of correctly classified predicted probabilities on a display device.

7. The system of claim 6, wherein the processor is further configured to minimize the distance by:

defining an error metric for training the machine learning algorithm, wherein the error comprises one of: a distance from the ideal zero probability of the plurality of negative class predictions and a distance from the ideal one probability of the plurality of positive class predictions; and minimizing the error metric for shifting one or more probability values in the machine learning model closer to one of: the ideal zero probability and the ideal one probability.

8. The system of claim 6, wherein the processor is further configured to maximize the distance by:

establishing a center of the predictive probability curve based on an ideal separation point for the plurality of positive class predictions and the plurality of negative class predictions using one or more statistical techniques as an original center; and performing one of:

a) computing a normalized distance for each of the plurality of positive class predictions and the plurality of negative class predictions from the original center; and b) shifting the original center of the predictive probability curve to 0.5 as a shifted center and computing a distance for each of the plurality of positive class predictions and the plurality of negative class predictions from 0.5 as a shifted center distance;

maximizing a score created based on an average of one of: the normalized distances and the shifted center distances, wherein the score weighs one of: a) distance of the positive class predictions higher than distance of the negative class predictions, upon determining that correctly classifying positive class predictions is more significant than correctly classifying negative class predictions, and b) distance of the negative class predictions higher than distance of the positive class predictions, upon determining that correctly classifying negative class predictions is more significant than correctly classifying positive class predictions; and thereby maximizing the distance of the plurality of predicted probability values from the original center or the shifted center of the predictive probability curve.

9. The system of claim 8, wherein the normalized distance is defined as:

a) For the plurality of positive class predictions:

normalized distance=$(P_i-P_{original\_center})/(1-P_{original\_center})$, upon $P_i>=P_{original\_center}$; and normalized distance=$-(P_{original\_center}-P_i)/P_{original\_center}$, upon $P_i<P_{original\_center}$; and b) For the plurality of negative class predictions:

normalized distance=$(P_{original\_center}-P_i)/P_{original\_center}$, upon $P_i<P_{original\_center}$; and normalized distance=$-(P_i-P_{original\_center})/(1-P_{original\_center})$, upon $P_i>=P_{original\_center}$; and wherein $P_i$ is $i^{th}$ prediction of the plurality of predictions, i is a whole number, and $P_{original\_center}$ is the original center.

10. The system of claim 8, wherein the shifted center distance is defined as:
  a) for the plurality of positive class predictions:

shifted center distance=$P_{i-adjusted}-0.5$;

b) for the plurality of negative class predictions:

shifted center distance=$0.5-P_{i-adjusted}$;

wherein for probabilities$>=P_{original\_center}$, $P_{adjusted}=0.5+\frac{1}{2}*((Pi-P_{original\_center})/(1-P_{original\_center}))$;

wherein for probabilities$<P_{original\_center}$ $P_{adjusted}=\frac{1}{2}*(Pi/P_{original\_center})$; and wherein $P_i$ is $i^{th}$ prediction of the plurality of predictions, i is a whole number and $P_{original\_center}$ is the original center.

11. A processor-implemented method for training a machine learning model for predicting probabilities for binary outcomes to automatically generate at least one positive class prediction close to an ideal one probability and at least one negative class prediction close to an ideal zero probability, the method comprising:
  generating a predictive probability curve based on a machine learning algorithm using a training dataset; and
  transforming the predictive probability curve into a transformed probability curve with probabilities spread close to the ideal one probability for a plurality of positive class predictions and close to the ideal zero probability for a plurality of negative class predictions, thereby introducing a valley in the transformed probability curve separating the plurality of positive class predictions from the plurality of negative class predictions, wherein a positive class prediction indicates a successful prediction case and a negative class prediction indicates a failed prediction case, and wherein the transforming comprises one of:
  1) minimizing a distance between: a) the ideal one probability and a predicted probability value of the plurality of positive class predictions; and b) the ideal zero probability and a predicted probability value of the plurality of negative class predictions; and
  2) maximizing a distance of a plurality of predicted probability values from a center of the predictive probability curve;
  wherein the trained machine learning model facilitates in real-time at least one of:
  1) enabling at least one automated workflow, based on one or more rules conditioned on a distribution of the predicted probabilities obtained from the trained machine learning model; and
  2) correctly classifying the plurality of predicted probabilities obtained from the trained machine learning model and presenting the plurality of correctly classified predicted probabilities on a display device.

12. The processor-implemented method of claim 11, wherein the minimizing comprises:
  defining an error metric for training the machine learning algorithm, wherein the error comprises one of: a distance from the ideal zero probability of the plurality of negative class predictions and a distance from the ideal one probability of the plurality of positive class predictions; and
  minimizing the error metric for shifting one or more probability values in a machine learning model closer to one of: the ideal zero probability and the ideal one probability.

13. The processor-implemented method of claim 11, wherein the maximizing comprises:
  establishing a center of the predictive probability curve based on an ideal separation point for the plurality of positive class predictions and the plurality of negative class predictions using one or more statistical techniques as an original center; and
  performing one of:
    a) computing a normalized distance for each of the plurality of positive class predictions and the plurality of negative class predictions from the original center; and
    b) shifting the original center of the predictive probability curve to 0.5 as a shifted center and computing a distance for each of the plurality of positive class predictions and the plurality of negative class predictions from 0.5 as a shifted center distance;
  maximizing a score created based on an average of one of: the normalized distances and the shifted center distances, wherein the score weighs one of: a) distance of the positive class predictions higher than distance of the negative class predictions, upon determining that correctly classifying positive class predictions is more significant than correctly classifying negative class predictions, and b) distance of the negative class predictions higher than distance of the positive class predictions upon determining that correctly classifying negative class predictions is more significant than correctly classifying positive class predictions; and
  thereby maximizing the distance of the plurality of predicted probability values from the original center or the shifted center of the predictive probability curve.

14. The processor-implemented method of claim 13, wherein the normalized distance is defined as:
  a) for the plurality of positive class predictions:

normalized distance=$(P_i-P_{original\_center})/(1-P_{original\_center})$, upon $P_i>=P_{original\_center}$; and normalized distance=$-(P_{original\_center}-P_i)/P_{original\_center}$, upon $P_i<P_{original\_center}$; and b) for the plurality of negative class predictions:

normalized distance=$(P_{original\_center}-P_i)/P_{original\_center}$, upon $P_i<P_{original\_center}$; and normalized distance=$-(P_i-P_{original\_center})/(1-P_{original\_center})$, upon $P_i>=P_{original\_center}$; and wherein $P_1$ is the $i^{th}$ prediction of the plurality of predictions, i is a whole number, and $P_{original\_center}$ is the original center.

15. The processor-implemented method of claim 13, wherein the shifted center distance is defined as:
a) for the plurality of positive class predictions shifted center distance=$P_{i\text{-}adjusted}$−0.5;

b) for the plurality of negative class predictions:

shifted center distance=0.5−$P_{i\text{-}adjusted}$;

wherein for probabilities>=$P_{original\_center}$:

$P_{adjusted}$=0.5+½*(($P_i$−$P_{original\_center}$)/(1−$P_{original\_center}$));

wherein for probabilities<$P_{original\_center}$:

$P_{adjusted}$=½*($P_i$/$P_{original\_center}$); and wherein $P_i$ is $i^{th}$ prediction of the plurality of predictions, i is a whole number, and $P_{original\_center}$ is the original center.

* * * * *